US012598126B2

(12) United States Patent
Halappa et al.

(10) Patent No.: US 12,598,126 B2
(45) Date of Patent: Apr. 7, 2026

(54) DIAL-OUT TELEMETRY FOR NETWORK MANAGEMENT

(71) Applicant: Ciena Corporation, Hanover, MD (US)

(72) Inventors: Ravi Halappa, San Jose, CA (US); Sijie Lin, Santa Clara, CA (US)

(73) Assignee: Ciena Corporation, Hanover, MD (US)

(*) Notice: Subject to any disclaimer, the term of this patent is extended or adjusted under 35 U.S.C. 154(b) by 122 days.

(21) Appl. No.: 18/623,444

(22) Filed: Apr. 1, 2024

(65) Prior Publication Data

US 2024/0340231 A1      Oct. 10, 2024

Related U.S. Application Data

(60) Provisional application No. 63/457,204, filed on Apr. 5, 2023.

(51) Int. Cl.
*H04L 41/082* (2022.01)
*H04L 12/46* (2006.01)
*H04L 43/103* (2022.01)

(52) U.S. Cl.
CPC ........ *H04L 43/103* (2013.01); *H04L 12/4633* (2013.01); *H04L 41/082* (2013.01)

(58) Field of Classification Search
CPC .. H04L 43/103; H04L 12/4633; H04L 41/082
USPC ........................................................ 709/221
See application file for complete search history.

(56) References Cited

U.S. PATENT DOCUMENTS

| | | | |
|---|---|---|---|
| 7,835,379 B2 | 11/2010 | Dravida et al. | |
| 8,462,626 B2 | 6/2013 | Desai et al. | |
| 11,171,853 B2 * | 11/2021 | Holness ................. | H04L 43/04 |
| 11,323,305 B1 * | 5/2022 | Liu ..................... | H04L 41/0645 |
| 11,363,116 B2 | 6/2022 | Tomkins | |
| 11,388,492 B2 | 7/2022 | Frankel et al. | |
| 11,457,086 B1 * | 9/2022 | McIntosh ........... | H04L 67/1031 |
| 11,777,811 B2 | 10/2023 | Tomkins et al. | |
| 2008/0033908 A1 | 2/2008 | Cooper et al. | |
| 2019/0222491 A1 | 7/2019 | Tomkins et al. | |
| 2021/0075618 A1 * | 3/2021 | Stephenson ......... | H04L 63/0846 |
| 2021/0091874 A1 * | 3/2021 | Agarwal ........... | H04Q 11/0062 |
| 2022/0078081 A1 | 3/2022 | Mahdi et al. | |
| 2022/0138278 A1 * | 5/2022 | Shribman ............ | G06F 16/955 |
| | | | 709/217 |

(Continued)

OTHER PUBLICATIONS

GRPC, "Authentication," https://grpc.io/docs/guides/auth/, Jan. 12, 2024, pp. 1-7.

(Continued)

*Primary Examiner* — Moustafa M Meky
*Assistant Examiner* — Kidest Mendaye
(74) *Attorney, Agent, or Firm* — Baratta Law PLLC; Lawrence A. Baratta, Jr.

(57) ABSTRACT

Dial-out telemetry for network management includes a tunnel client configured to form a tunnel service for telemetry inside a dialed-out tunnel from the tunnel client to a tunnel server, wherein the tunnel service is between a network element, communicatively coupled to the tunnel client, and a network management system communicatively coupled to the tunnel server, and preserve the tunnel service via keepalives including during a software upgrade associated with any of the network management system and the network element and with the tunnel service itself.

20 Claims, 18 Drawing Sheets

(56)                References Cited

U.S. PATENT DOCUMENTS

| | | | |
|---|---|---|---|
| 2022/0166500 A1 | 5/2022 | Bownass et al. | |
| 2023/0019374 A1* | 1/2023 | Mestery | H04L 63/164 |
| 2023/0110199 A1* | 4/2023 | Gupta | H04L 12/4641 |
| | | | 709/238 |
| 2023/0123781 A1* | 4/2023 | Kaimal | H04L 43/50 |
| | | | 726/12 |
| 2023/0333839 A1* | 10/2023 | Koike | G06F 8/656 |
| 2023/0379391 A1* | 11/2023 | Langer | G06F 3/0604 |
| 2024/0223439 A1* | 7/2024 | Lo | H04L 45/851 |
| 2024/0273157 A1* | 8/2024 | Kol | G06F 16/955 |
| 2024/0340231 A1* | 10/2024 | Halappa | H04L 12/4633 |

OTHER PUBLICATIONS

J. Protzman et al., "# TCP over gRPC Tunnel," https://raw. githubusercontent.com/openconfig/grpctunnel/main/doc/grpctunnel_design.md, Jul. 2022, Pags 1-7.

C. Rigney et al., "Remote Authentication Dial in User Service (RADIUS)," Network Working Group, Obsoletes: 2138, Category: Standards Track, Jun. 2000, pp. 1-76.

C. Rigney, "RADIUS Accounting," Network Working Group, Category: Informational, Obsoletes: 2139, Jun. 2000, pp. 1-28.

C. de Laat et al., "Generic AAA Architecture," Network Working Group, Category: Experimental, Aug. 2022, pp. 1-26.

J. Vollbrecht et al., "AAA Authorization Framework," Network Working Group, Category: Informational, Aug. 2000, pp. 1-35.

P. Calhoun et al., "Diameter Base Protocol," Network Working Group, Category: Standards Track, Sep. 2003, pp. 1-147.

T. Dierks et al., "The Transport Layer Security (TLS) Protocol Version 1.2," Network Working Group, Obsoletes: 3268, 4346, 4366, Category: Standards Track, Aug. 2008, pp. 1-104.

S. Winter et al., "Transport Layer Security (TLS) Encryption for RADIUS," Internet Engineering Task Force (IETF), Category: Experimental, ISSN: 2070-1721, May 2012, pp. 1-22.

* cited by examiner

| wait_for_co nn_ready | Bool | A gRPC parameter made as a user-configurable parameter that can be used to control whether any gRPCs sent should wait until the connection is ready, by default. If such a knob is set to false, application stack can use gRPC api's to identify the transient connection failure condition immediately to abort sending any RPC's over a failed network. If not, gRPC by default will attempt to connect until the default deadline is exceeded. Exposing this as a user-configurable parameter, an application stack built upon gRPC stack can control the behavior of sending/not sending RPC over a network connection. | A Yang Data Model Proposal for such user-configured detection-parameters would look like this:<br><br>Container failure-detection-parameters {<br>     leaf wait_for_conn_ready;<br>     leaf timeout_per_rpc;<br>     leaf http2_keepalive_ping_time_ms;<br>     leaf http2_keepalive_ping_timeout_ms;<br>     leaf http2_keepalive_permit_without_calls;<br>     leaf http2_keepalive_max_ping_without_data;<br>} |
| --- | --- | --- | --- |
| timeout_per _rpc | Duration | A gRPC parameter made as a user-configurable parameter that can be used to set the default timeout in seconds set for gRPCs that are sent by tunnel-client. If no reply is received in the specified amount of time, the request is aborted and is identified as a condition of DEADLINE_EXCEEDED error status at the gRPC layer which will be available for further inspection or for other action to be taken upon, such as reconnect or redial. | |
| http2_keep alive_ping_t ime_ms | Duration | A gRPC parameter made as a user-configurable parameter that can be used to control the period (in milliseconds) after which a http2 keepalive ping is sent on the transport, between tunnel-client and tunnel-server. | |
| http2_keep alive_ping_t imeout_ms | Duration | A gRPC parameter made as a user-configurable parameter that can be used to control the time (in milliseconds) that the tunnel-client after sending a keepalive ping waits for an acknowledgement from the tunnel-server. If it does not receive an acknowledgment within this defined time, tunnel-client can close the existing connection, or adopt based upon reconnect-paramaters. | |
| http2_keep alive_permit _without_ca lls | Bool | A gRPC parameter made as a user-configurable parameter that can be used to control allowing/not-allowing tunnel-client to send keepalive pings to be sent even if there are no RPC calls in flight. | |
| http2_keep alive_max_ ping_withou t_data | UInt32Va lue | A gRPC parameter made as a user-configurable parameter that can be used to control the maximum number of http2 pings that can be sent by tunnel-client when there is no data/header frame to be sent. gRPC Core will not continue sending pings if we run over this set limit. Setting it to 0 allows gRPC core to send http2 pings without any such restriction. | |

*FIG. 6*

| max_retry_attempts_per_rpc | uint32 | A user-configurable parameter that can be used to control the maximum number of retries for an RPC after failure. | A Yang Data Model Proposal for such user-configured detection-parameters would look like this:<br>enum grpc_code {<br>..<br>..<br>}<br>leaf-list retryable_status_codes {<br>  type grpc_code;<br>}<br>grouping backoff_properties {<br>       leaf max_retry_attempts;<br>       leaf retry_initial_backoff;<br>       leaf retry_max_backoff;<br>       leaf retry_backoff_multipler;<br>       list retryable_status_codes;<br>}<br>container rpc_retry_policy {<br>       uses backoff_properties;<br>} |
| retry_initial_backoff_per_rpc | Duration | A gRPC connection backoff protocol related parameter that can be made as a user-configurable parameter for a tunnel-target which is used to control applying an exponential backoff strategy for retrying a failed RPC.<br>The initial retry attempt can occur at random(0, retry_initial_backoff_per_rpc). In general, the nth attempt will occur at random(0,min(initial_backoff_per_rpc*retry_backoff_multiplier_per_rpc**(n-1), retry_max_backoff_per_rpc)). | |
| retry_max_backoff_per_rpc | Duration | A gRPC connection backoff protocol related parameter that can be made as a user-configurable parameter for a tunnel-target which is used to control applying the exponential backoff strategy for retrying a failed RPC. | |
| retry_backoff_multiplier_per_rpc | float | A gRPC connection backoff protocol related parameter that can be made as a user-configurable parameter for a tunnel-target which is used to control applying the exponential backoff strategy for retrying a failed RPC. | |
| retryable_status_codes_per_rpc | List of enums | A user-configurable list of gRPC status codes that can be allowed for an used to specify which would require to be the error condition based on which a retying condition can be applied. | |
| max_attempts_per_conn (ID 52411 newly defines such a parameter) | uint32 | A user-configurable parameter that will be user to control the number of attempts that the tunnel-client-application would attempt to redial (i.e, by starting a new http2 handshake followed by tunnel-client sending a new register operation towards tunnel-server), upon a failure of previous established and registered dial-out connection tears down due to any failure scenarios. | container conn_redial_policy {<br>       uses<br>       backoff_properties;<br>} |
| initial_backoff_per_conn (ID 52411 newly defines such a parameter) | Duration | A user-configurable parameter that will be user to control applying exponential backoff strategy for its attempts to re-dial. | |
| max_back_off_per_conn (ID 52411 newly defines such a parameter) | Duration | Applicable for connection/re-dial. A user-configurable parameter that will be user to control applying exponential backoff strategy for its attempts to re-dial. | |
| backoff_multiplier_per_conn (ID 52411 newly defines such a parameter) | float | Applicable for connection/re-dial. A user-configurable parameter that will be user to control applying exponential backoff strategy for its attempts to re-dial. | |
| retryable_status_code_per_conn (ID 52411 newly defines such a parameter) | List of enums | Applicable for connection/re-dial. A user-configurable list of tunnel error status codes that can be allowed to specify by a user to indicate on which error condition should the tunnel-client apply re-dial attempts. | |

*FIG. 7*

Known and standard mechanics for dial-out double encryption

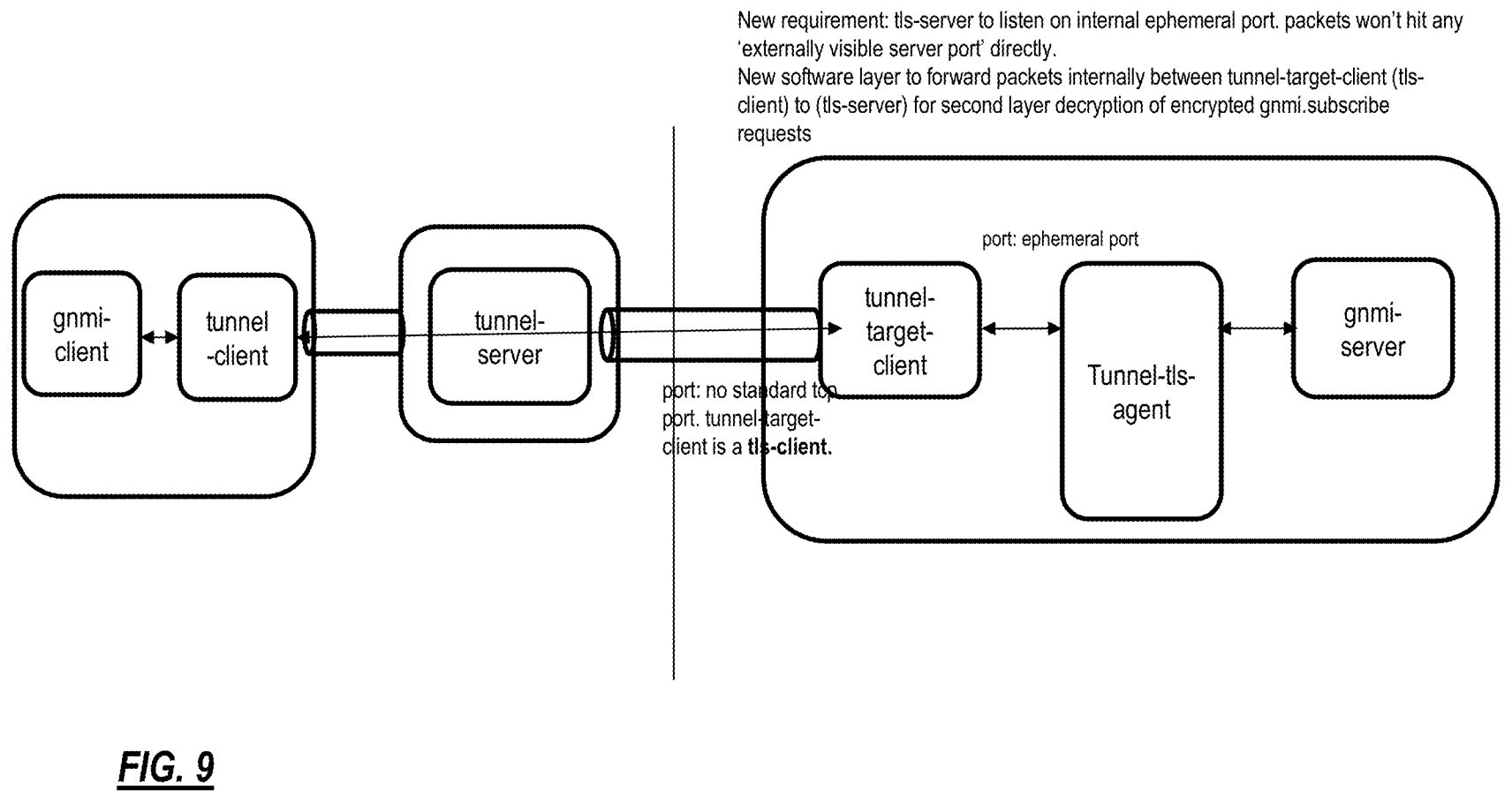

New requirement: tls-server to listen on internal ephemeral port. packets won't hit any 'externally visible server port' directly.

New software layer to forward packets internally between tunnel-target-client (tls-client) to (tls-server) for second layer decryption of encrypted gnmi.subscribe requests port: ephemeral port gnmi-server Tunnel-tls-agent tunnel-target-client port: no standard to port. tunnel-target-client is a tls-client.

tunnel-server tunnel-client gnmi-client

*FIG. 9*

Proto-parser-service on network element B after receiving new-service.proto parses, compiles, and auto-generates a new-service-client (or new-service-server) fully functional executable that which can start communicating with network element inside the tunnel Service-keepalives preserves connection for supported services while the service's software gets upgraded from V1 to V2 inline without loosing connection.

<u>40</u>

FORM A TUNNEL SERVICE FOR TELEMETRY INSIDE A DIALED-OUT TUNNEL FROM THE TUNNEL CLIENT TO A TUNNEL SERVER, WHEREIN THE TUNNEL SERVICE IS BETWEEN A NETWORK ELEMENT, COMMUNICATIVELY COUPLED TO THE TUNNEL CLIENT, AND A NETWORK MANAGEMENT SYSTEM COMMUNICATIVELY COUPLED TO THE TUNNEL SERVER — 42

↓

PRESERVE THE TUNNEL SERVICE VIA KEEPALIVES INCLUDING DURING A SOFTWARE UPGRADE ASSOCIATED WITH ANY OF THE NETWORK MANAGEMENT SYSTEM AND THE NETWORK ELEMENT AND WITH THE TUNNEL SERVICE ITSELF — 44

FORM A TUNNEL SERVICE FOR TELEMETRY INSIDE A DIALED-OUT TUNNEL FROM A TUNNEL CLIENT TO THE TUNNEL SERVER, WHEREIN THE TUNNEL SERVICE IS BETWEEN A NETWORK MANAGEMENT SYSTEM, COMMUNICATIVELY COUPLED TO THE TUNNEL SERVER, AND A NETWORK ELEMENT COMMUNICATIVELY COUPLED TO THE TUNNEL CLIENT — 62

↓

PRESERVE THE TUNNEL SERVICE VIA KEEPALIVES INCLUDING DURING A SOFTWARE UPGRADE ASSOCIATED WITH ANY OF THE NETWORK MANAGEMENT SYSTEM AND THE NETWORK ELEMENT AND WITH THE TUNNEL SERVICE ITSELF — 64

Figure 18:
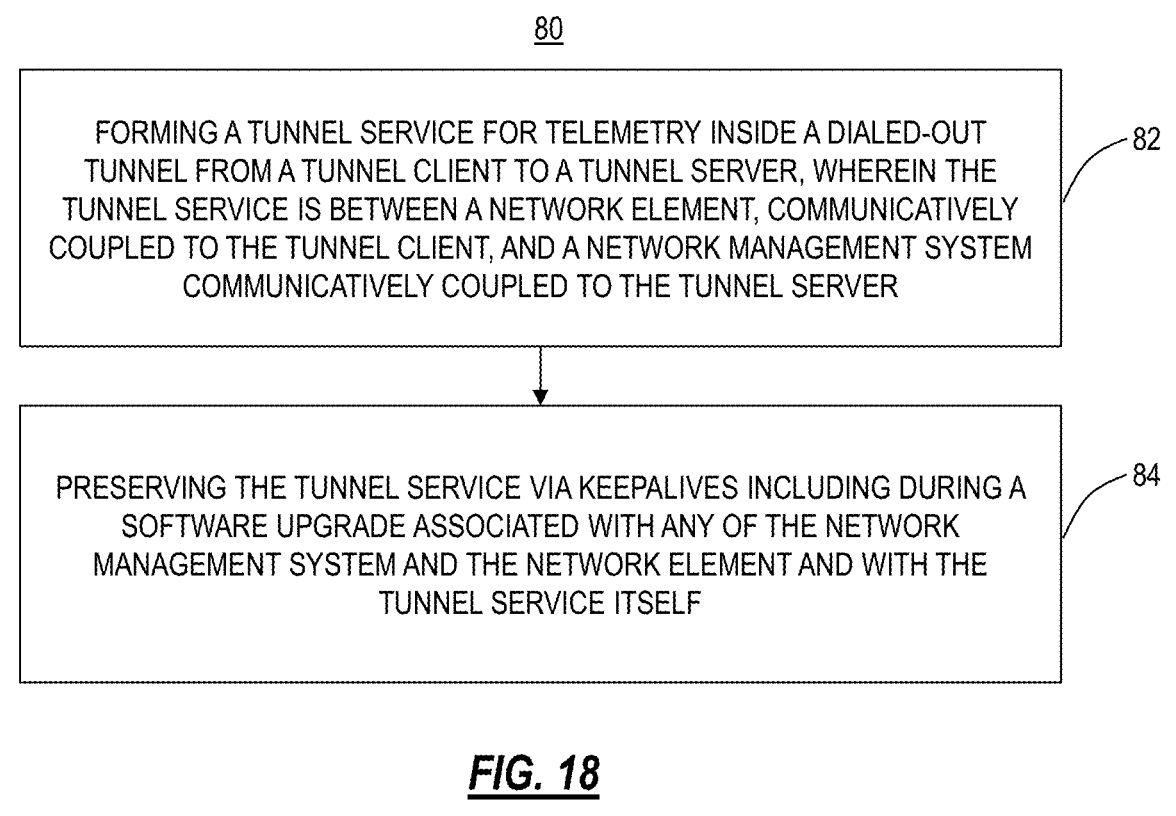

FORMING A TUNNEL SERVICE FOR TELEMETRY INSIDE A DIALED-OUT
TUNNEL FROM A TUNNEL CLIENT TO A TUNNEL SERVER, WHEREIN THE
TUNNEL SERVICE IS BETWEEN A NETWORK ELEMENT, COMMUNICATIVELY
COUPLED TO THE TUNNEL CLIENT, AND A NETWORK MANAGEMENT SYSTEM
COMMUNICATIVELY COUPLED TO THE TUNNEL SERVER

82

PRESERVING THE TUNNEL SERVICE VIA KEEPALIVES INCLUDING DURING A
SOFTWARE UPGRADE ASSOCIATED WITH ANY OF THE NETWORK
MANAGEMENT SYSTEM AND THE NETWORK ELEMENT AND WITH THE
TUNNEL SERVICE ITSELF

DIAL-OUT TELEMETRY FOR NETWORK MANAGEMENT

CROSS-REFERENCE TO RELATED APPLICATION(S)

The present disclosure claims priority to U.S. Provisional Patent Application No. 63/457,204, filed Apr. 5, 2023, the contents of which are incorporated by reference in their entirety.

FIELD OF THE DISCLOSURE

The present disclosure relates generally to networking and computing. More particularly, the present disclosure relates to systems and methods for dial-out telemetry for network management.

BACKGROUND OF THE DISCLOSURE

Telemetry is data collected from network elements, such as switches, routers, firewalls, etc., where the data describes operational characteristics of the network, e.g., Operation, Administration, Maintenance (OAM) data, Simple Network Management Protocol (SNMP) information, Performance Monitoring (PM) data, and the like. A telemetry service can be implemented by a network management system. The telemetry service can dial into the network elements to collect information to process it on their end and the network elements transmit to data when such network element is either requested to give the data or polled to give the data. While asynchronous notification from the network elements towards the network management system produces the data without the need for a network management system to repeatedly request or poll for the data (i.e., dial in), it is still required by the network management system to connect to all the network elements and at least initiate one request towards each of the network element upon which the network elements knows to send the data. Even in the case of streaming telemetry data, it has always been the case where the network management system initiates the connection towards network element.

BRIEF SUMMARY OF THE DISCLOSURE

The present disclosure relates to systems and methods for dial-out telemetry for network management and various aspects associated therewith, including tunnel keepalive mechanisms, tunnel-based Authentication, Authorization, and Accounting (AAA), RADIUS, and the like. Dial-out technology is reversal of the traditional telemetry service where the network element initiates connections towards the network management system (also called collectors) and then streams data to them. The exact list of collectors, paths of data, and various connection related variables are configured via other northbound interfaces like NETCONF or a Command Line Interface (CLI). Thus, a network element has a primary role of initiating a connection towards the collectors, discovery of the collectors in the network, determining the reachability of the collectors.

Major Use-Cases for Dial-Out Telemetry, e.g., and without Limitation, Include:

(1) Firewall service sits between a network device and telemetry collectors, and the collectors cannot initiate connections.

(2) Collector is behind another layer of network elements (access) that have NAT and thus cannot establish direct connection to the required network element at the core of the network.

(3) Network management systems and collectors prefer to work in stateless mode and shed the complexity of maintaining telemetry state of each and every network element to another configuration system.

(4) Layered architecture of the network management system for load balancing of the network elements that are being managed.

Advantages of a Dial-Out Telemetry Approach, e.g., and without Limitation, are:

(1) No need to expose a service to the outside world (reducing the attack surface, even if that can already be mitigated by using a management Virtual Routing and Forwarding (VRF) and/or control-plane Access Control Lists (ACLs).

(2) No need to have a system to manage the shared responsibility of collecting telemetry from each and every network element.

(3) Instead of worrying which collector is responsible for collecting data from switch X and what to do when this collector does, the switch is responsible for streaming its telemetry out to a preconfigured list of targets.

(3a) The pre-configured list could be a static list of Internet Protocol (IP)/ports, a Domain Name System (DNS) name that resolves to multiple IP addresses (and is periodically re-resolved), or better, some name to lookup in a service discovery system backed by something like etcd/Zookeeper (which are distributed systems that provide coordination and naming services for distributed applications). The network element just needs to connect to one, does not matter which.

(4) It is easier to have a stateless collector backend (just accept connections, optionally authenticate devices, and store the incoming update stream in a database or Kafka-like bus or whatever) as opposed to maintaining state regarding what targets to collect from and what paths to subscribe to on each one of them.

In various example embodiments, the present disclosure provides dial-out gRPC tunnel and various network element management services as dialed-out tunnel-service such as gRPC Network Management Interface (gNMI) service for telemetry and other network element operation, management and administration. The gRPC Network Management Interface (gNMI) is a protocol defined by the OpenConfig community for the management of network devices. It leverages the gRPC framework for transporting messages and offers a more modern, efficient, and flexible way of managing network configurations compared to traditional network management protocols like SNMP, Command Line Interface (CLI), or NETCONF. Networks use gNMI to programmatically interact with network devices for configuration management, service orchestration, and retrieval of telemetry data, enabling more dynamic and automated network control and visibility.

The gRPC Tunnel is used by a network element to initiate connections to a collector. The network element is a tunnel client and the collector is the tunnel server, such that the network element can initiate connections to the collector, for dial-out. The tunnel is a gRPC tunnel as defined in the open-config tunnel.proto specification, which creates a transparent, bi-directional Transmission Control Protocol (TCP)-over-gRPC tunnel connecting the network element as a tunnel client which initiates the connection towards the collector which is a tunnel server. This is an approach which allows a gRPC client and server to communicate using a TCP over gRPC tunnel to support external connections from either endpoint over TCP and forward them using gRPC streams. It is possible that this tunnel could be used to forward more than gRPC traffic as telemetry data. For details on how the TCP-over-gRPC tunnel works, there is an open-config standard specification, TCP over gRPC Tunnel, July 2022, available at github.com/openconfig/grpctunnel/blob/master/doc/grpctunnel_design.md, the contents of which are incorporated by reference in their entirety. While the present disclosure utilizes gNMI and TCP-over-gRPC, those skilled in the art will recognize other protocols and approaches are also contemplated consistent with the example embodiments described herein.

Dial-out telemetry for network management includes a tunnel client configured to form a tunnel service for telemetry inside a dialed-out tunnel from the tunnel client to a tunnel server, wherein the tunnel service is between a network element, communicatively coupled to the tunnel client, and a network management system communicatively coupled to the tunnel server, and preserve the tunnel service via keepalives including during a software upgrade associated with any of the network management system and the network element and with the tunnel service itself. A tunnel server is configured to form a tunnel service for telemetry inside a dialed-out tunnel from a tunnel client to the tunnel server, wherein the tunnel service is between a network management system, communicatively coupled to the tunnel server, and a network element communicatively coupled to the tunnel client, and preserve the tunnel service via keepalives including during a software upgrade associated with any of the network management system and the network element and with the tunnel service itself.

BRIEF DESCRIPTION OF THE DRAWINGS

The present disclosure is illustrated and described herein with reference to the various drawings, in which like reference numbers are used to denote like system components/method steps, as appropriate, and in which:

FIG. 6 is a table of some examples of user-configurable detection-parameters including when applicable and the associated use.

FIG. 7 is a table of some examples of user-configurable gRPC parameters as reconnect-parameters and a new set of gRPC tunnel-client specific re-dial parameters including when applicable and the associated use.

FIG. 9 is a diagram of an example call flow for tunnel-service gNMI with a proxy TLS tunnel client to reduce double encryption overhead for multiple tunnel services.

FIG. 16 is a flowchart of a process implemented at a tunnel client.

FIG. 17 is a flowchart of a process implemented at a tunnel server.

FIG. 18 is a flowchart of a process between a tunnel server and a tunnel client.

DETAILED DESCRIPTION OF THE DISCLOSURE

Again, the present disclosure relates to systems and methods for dial-out gRPC tunnel and gNMI telemetry as tunnel service for network management, and applicable to any gRPC-Tunnel based service(s).

OpenConfig Dial-Out Tunnel Service Overview

Figure 1:
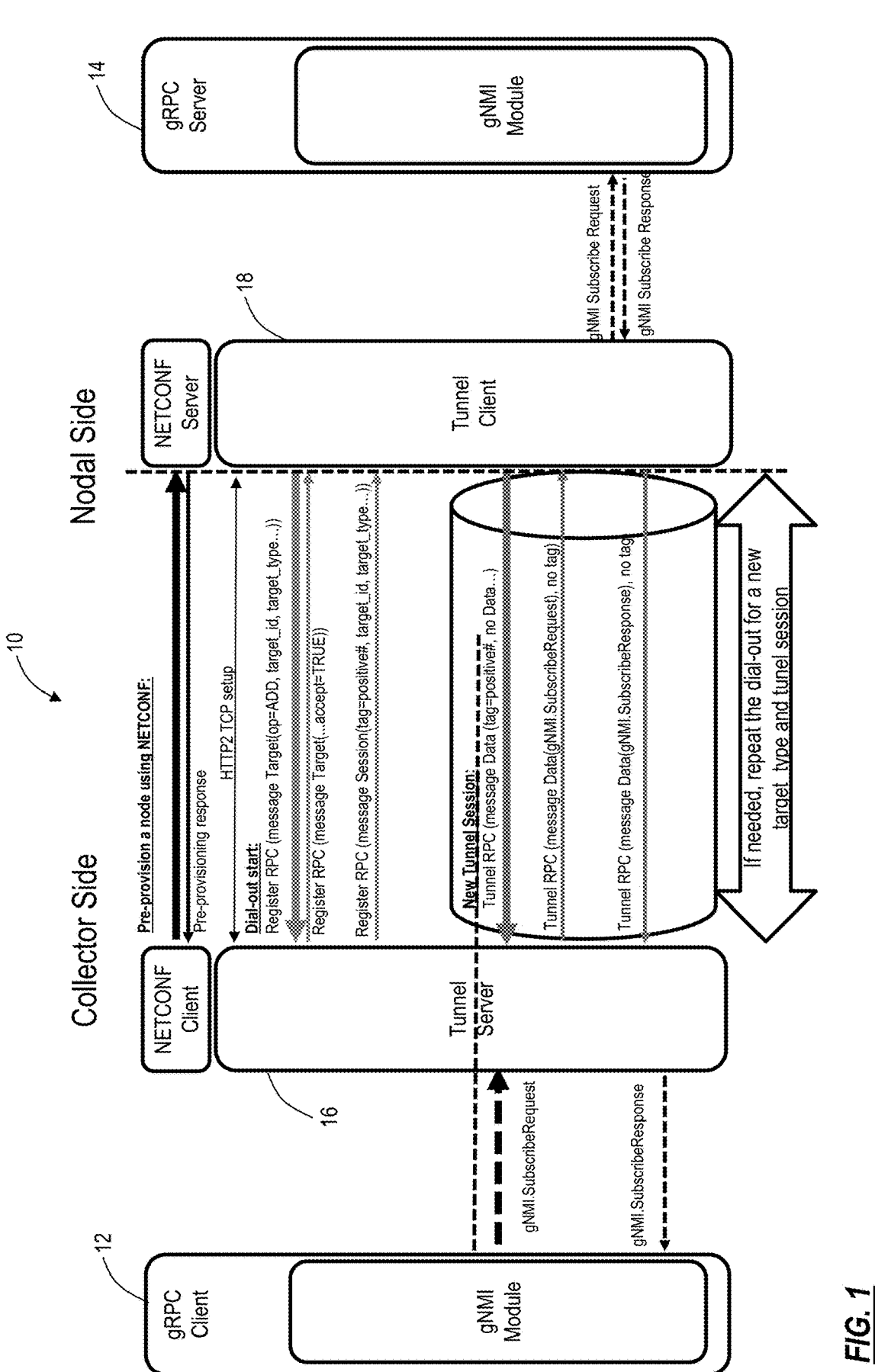
FIG. 1 is a diagram of an OpenConfig dial-out gRPC tunnel with gNMI as tunnel service.
Figure 2:
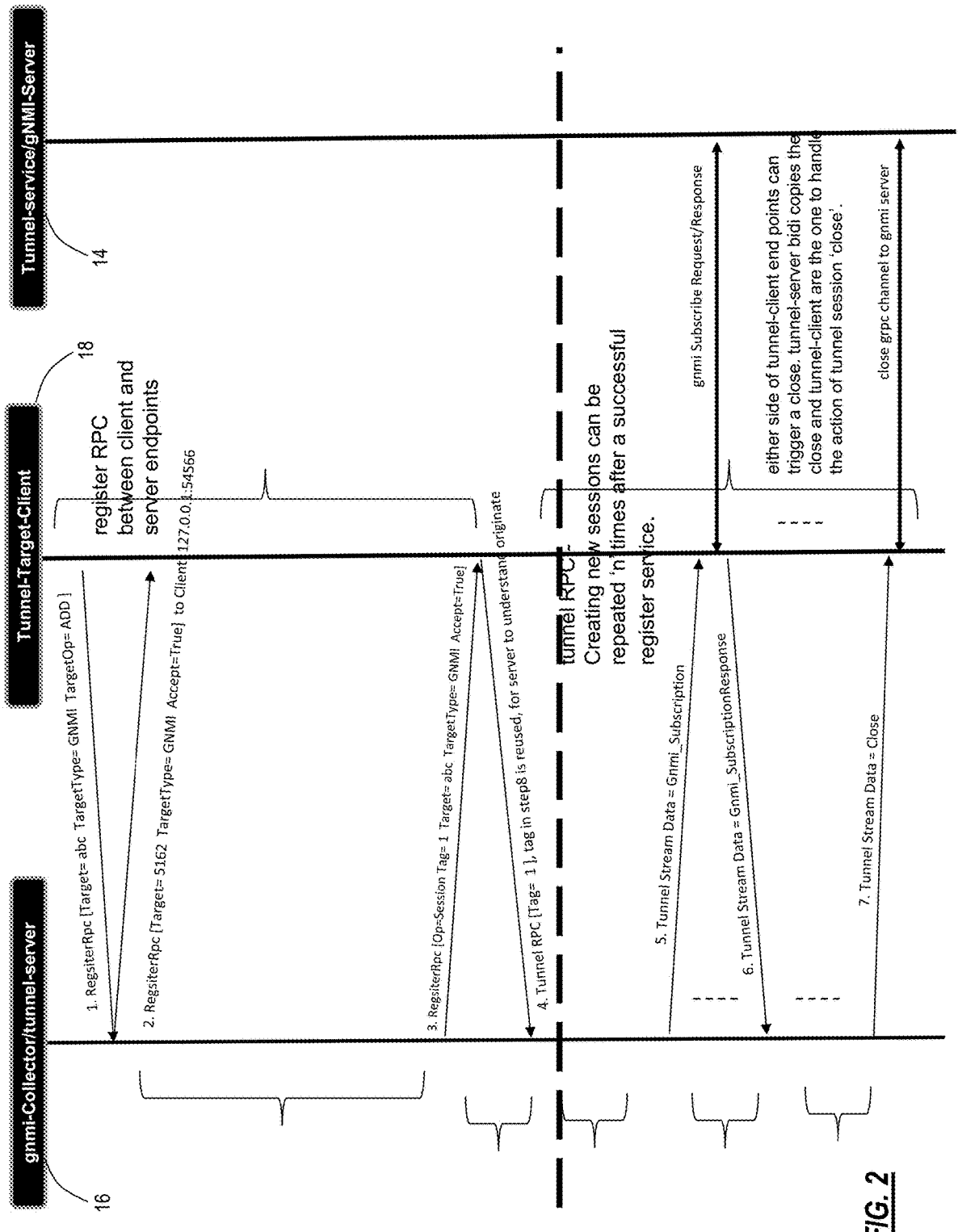
FIG. 2 is a diagram illustrating communication in the OpenConfig dial-out gRPC tunnel with gNMI as tunnel service.

FIG. 1 is a diagram of an OpenConfig dial-out gRPC tunnel with gNMI as tunnel service 10. FIG. 2 is a diagram illustrating communication in the OpenConfig dial-out gRPC tunnel with gNMI as tunnel service 10. The Open-Config dial-out tunnel service 10 provides a mechanism for network elements to establish a gRPC Tunnel to a network management system and gNMI service as dialed-out tunnel service sends telemetry data or configuration state inside dialed-out gRPC Tunnel from the network element to the network management system. This is in contrast to the traditional model where the network management system dials in to the network element over direct gRPC to pull information or push configuration changes.

In the context of OpenConfig and gNMI, a dial-out service would involve the network element initiating the connection to the telemetry collector or management platform. This is often used for streaming telemetry, where the network element pushes updates about its state in real-time, as opposed to the network management system polling the device at regular intervals. Advantages of this approach include reducing the load on the network management system, enabling the network to scale in terms of network elements (e.g., hundreds or even thousands of network elements), and the like.

Key Aspects and Uses of the OpenConfig Dial-Out Tunnel Service 10 Include:

(1) Telemetry Streaming: Network elements can stream telemetry data such as interface statistics, routing information, or system health metrics to a centralized monitoring system. This is useful for real-time monitoring and anomaly detection.

(2) Event-Driven Notifications: The service can be configured to send notifications based on events, such as configuration changes or specified thresholds being exceeded. This allows for rapid response to potential issues.

(3) Scalability: Dial-out models are more scalable than traditional polling models, as they offload the initiation of communication to the network elements themselves, reducing the amount of state that the management system needs to keep.

(4) Efficiency: This model can be more efficient because it avoids the overhead associated with polling every device at regular intervals, regardless of whether there is new data to be collected.

(5) Security: Dial-out models can enhance security by reducing the number of open ports required on the device, as the connection is initiated from inside the network towards the trusted management platform.

The OpenConfig dial-out tunnel service 10 includes a gRPC client 12 which is a network management system, and a gRPC server 14 which is a network element, which are interconnected by a tunnel formed between a tunnel server 16, communicatively coupled to the gRPC client 12, and a tunnel client 18, communicatively coupled to the gRPC server 14. The tunnel server 16 is a so-called collector or collector side, and the tunnel client 18 is nodal side, or simply the network element.

The following describes an example of flow of communication between a network element and the collector.

(1) tunnel server is configured/pre-provisioned via NET-CONF RPC such that tunnel target can initiate a target register RPC towards the tunnel client 18 when the tunnel server 16 is booted up.

(2) bi-directional tunnel registration RPC is exchanged between the tunnel client 18 and the tunnel server 16 with identification of target_id as a hostname and target_type (type of service which a target intends to function over an established tunnel).

(3) Pre-provisioning happens on the nodal side so that it is aware of any needed pre-configurations, e.g., Tunnel Server IP address or URI or FQDN, etc.

(4) A gRPC (i.e., HTTP2 TCP) connection is started by the tunnel client 18 to a pre-configured IP address for the tunnel server 16, including:

(a) tunnel.proto shows parameters for a single gRPC Connection. The tunnel server 16 builds its own gRPC Connection map.

(b) Transport Layer Security (TLS) starts here.

(c) The gRPC Connection is started by the network element's tunnel client 18 after reboot only.

(d) The maximum number of pre-configured tunnel server 16 IP addresses is platform-dependent.

(5) A Register RPC is sent by the tunnel client 18 to register the target_id with the tunnel server 16. The Register RPC:

(a) Is a long-lived RPC that listens until a request for a new Tunnel Session is received (in this scenario it comes from the tunnel server 16).

(b) Stays open while both the tunnel client 18 and tunnel server 16 are alive.

(c) Uses (i.e., message Target):

(i) op=ADD, REMOVE or UNKNOWN (ii) accept=to acknowledge the registration or op (iii) target_id=unique node identifier (e.g., can be IP address, hostname, chassis serial number, Media Access Control (MAC) address, etc.) as well as a combination.

(iv) target_type=identifies the protocol of the Tunnel Session (e.g., can be UNKNOWN, SSH, GNMI_GNOI, etc.).

(v) error=a pre-defined list of errors to return.

(vi) A tunnel client 18 may register for multiple protocols (via target_type) with one tunnel server 16, and could register with multiple tunnel servers 16.

(6) The gNMI Module (on the gRPC client 12) communicates with the tunnel server 16:

(a) It is up to the operator if the communication between gNMI Module (on the gRPC client 12) and the tunnel server 16, uses TLS (or not)

(b) A new RPC is requested by the gNMI Module (on the gRPC client 12) from the tunnel server 16.

(c) The tunnel server 16 can request a Tunnel Session from one (or more) tunnel client 18.

(6) The gNMI Module (on the gRPC client 12) communicates with the tunnel server 16.

(7) The tunnel server 16 sends a Register RPC to the tunnel client 18, to see if the tunnel client 18 can handle a new Tunnel Session (or not):

(a) Register RPC uses (i.e., message Session):

(i) tag=used to request new tunnel streams for a certain tag. Where each TCP packet on the Tunnel Session needs to be tagged with this tag to know where to go. The node uses negative tags, and the controller uses positive tags (no 0 used).

(ii) accept=used to acknowledge the tag.

(iii) target_id=unique node identifier (e.g., can be IP address, hostname, chassis serial no., MAC address, etc.).

(iv) target_type=identifies the protocol of the tunnel session (e.g.: can be UNKNOWN, SSH, GNMI_GNOI . . . etc.). In the current release, only GNMI_GNOI service is supported.

(v) error=a pre-defined list of errors to return.

(b) If the Tunnel Session terminates for any reason, the node attempts to re-establish the session. The retries will start after 30 seconds with the collector, with exponential back-off up to a maximum retry interval or attempt. If the node cannot reconnect, it shall generate an error.

(8) The tunnel client 18 has an embedded Client Register Handler that checks if it can handle the requested new Tunnel Session:

(a) If it cannot, the Client Register Handler (on tunnel client 18) will provide as error from a pre-defined list of errors to return.

(b) If it can, the tunnel client 18 will acknowledge via the Register RPC's accept field (of the message Session), and a Tunnel RPC's tag is considered unique per Tunnel Session, e.g., acting as a tunnel-id.

(9) The tunnel client 18 will start a new Tunnel Session with the Tunnel Server via the Tunnel RPC. A Tunnel RPC's message data uses/has:

(a) tag=each TCP packet on the Tunnel Session needs to be tagged with this tag to know where to go.

(b) data=raw bytes.

(c) close=a Boolean value that marks the forwarding of the last TCP packet (of the encapsulated gNMI/gNOI RPC) is done.

(10) The tunnel server 16 will accept the new Tunnel Session.

(11) The tunnel client 18 has an embedded Client Handler that now knows the new Tunnel Session.

(12) The Tunnel Session is now established, and the tunnel server 16 can start sending encapsulated gNMI/gNOI RPCs to the tunnel client 18, e.g., gNMI.SubscribeRequest, as encapsulated TCP packets via the Data message of the Tunnel RPC.

(13) The tunnel client 18 can start sending telemetry updates to the tunnel server 16, e.g., gNMI.Subscrib-eResponse, as encapsulated TCP packets in the Tunnel Session via the Data message of the Tunnel RPC.

Dynamic Update of Target Properties Between Tunnel Client and Tunnel Server and Auto Adoption of Updated Properties by the Tunnel Server In an embodiment, the present disclosure describes a mechanism that allows targets in tunnel-based dial-out technology to dynamically communicate and exchange data for any update to the target properties between the tunnel client 18 and the tunnel server 16 and allows auto adoption of updated properties with the tunnel server 16.

Currently, there are no known ways or methods in the tunnel-based dial-out protocol that allows an already added and registered target with a dial-out collector to be updated with any change or update of properties of the target/network element without having the connected session getting disconnected or torn down. Tunnel.proto which serves as a contract between the tunnel client 18 and the tunnel server 16 does not have any mechanism that would allow either sending an update registration message or modify an existing registered target. Such limitation results in an operator having disable an existing connection and make changes to the properties of the target and then re-enabling a target network element to redial or reconnect.

An example where this is not an acceptable expectation is in cases where the 'target' name, which is a string as per the proto, is identified and a value formed using a well-known combination of values of {hostname:vendor:model:version}, while vendor, model and version parts of the information that is used as a target identifier is a fixed value that might be required to be preserved for the life of the session, hostname is typically dynamic information that may change any time during the life of a registered target for a tunnel session.

In cases where such an update to the properties for the target occurs, without an ability to exchange or send an update registration to an already connected session, current tunnel.proto based dial-out technology limits any change in the properties of the target to not being reflected either causing incorrect information to be propagated in the network or incorrect representation of the target itself for its identification from information used in previous registration messages.

The present disclosure solves the above set of limitations by introducing an UPDATE operation capability to the dial-out tunnel registration mechanism to allow communicating the updates to the properties of an existing connected session without having to disconnect a connected session.

An update operation capability is an inline operation request/response exchanged between the tunnel client 18 and the tunnel server 16 that involves acknowledgment and request rejection mechanism that allows tunnel client and tunnel server to come to an agreement with the updates of the target properties that a target wishes to communicate and the tunnel server dynamically adopts with the updates without having to terminate the connection.

While one of the key target properties is the target identifier string itself within the update message but it is not limited to be used only for updating the target name and serves as a mechanism for exchanging any target properties of a connected tunnel session to communicate its updated properties and for tunnel server to dynamically adopt for such update(s).

```
message RegisterOp {
    oneof Registration {
        Target target = 1;
        Session session = 2;
        Subscription subscription = 3;
    }
}
message Target {
    enum TargetOp {
        UNKNOWN = 0;
        ADD = 1;
        REMOVE = 2;
        UPDATE = 3;
    }
    TargetOp op = 1; // Used to ack the registration of target and
target_type.
    bool accept = 2; // Target identifies which handler to use for
a tunnel stream.
    string target = 3; // String value of the corresponding TargetType
for a standard
    // protocol. A non-enumerated protocol is supported so long as both
    // tunnel client and server are in agreement on a particular value.
    string target_type = 4;
    string error = 5;
    Update update_msg = 6;
}
```

Figure 3:
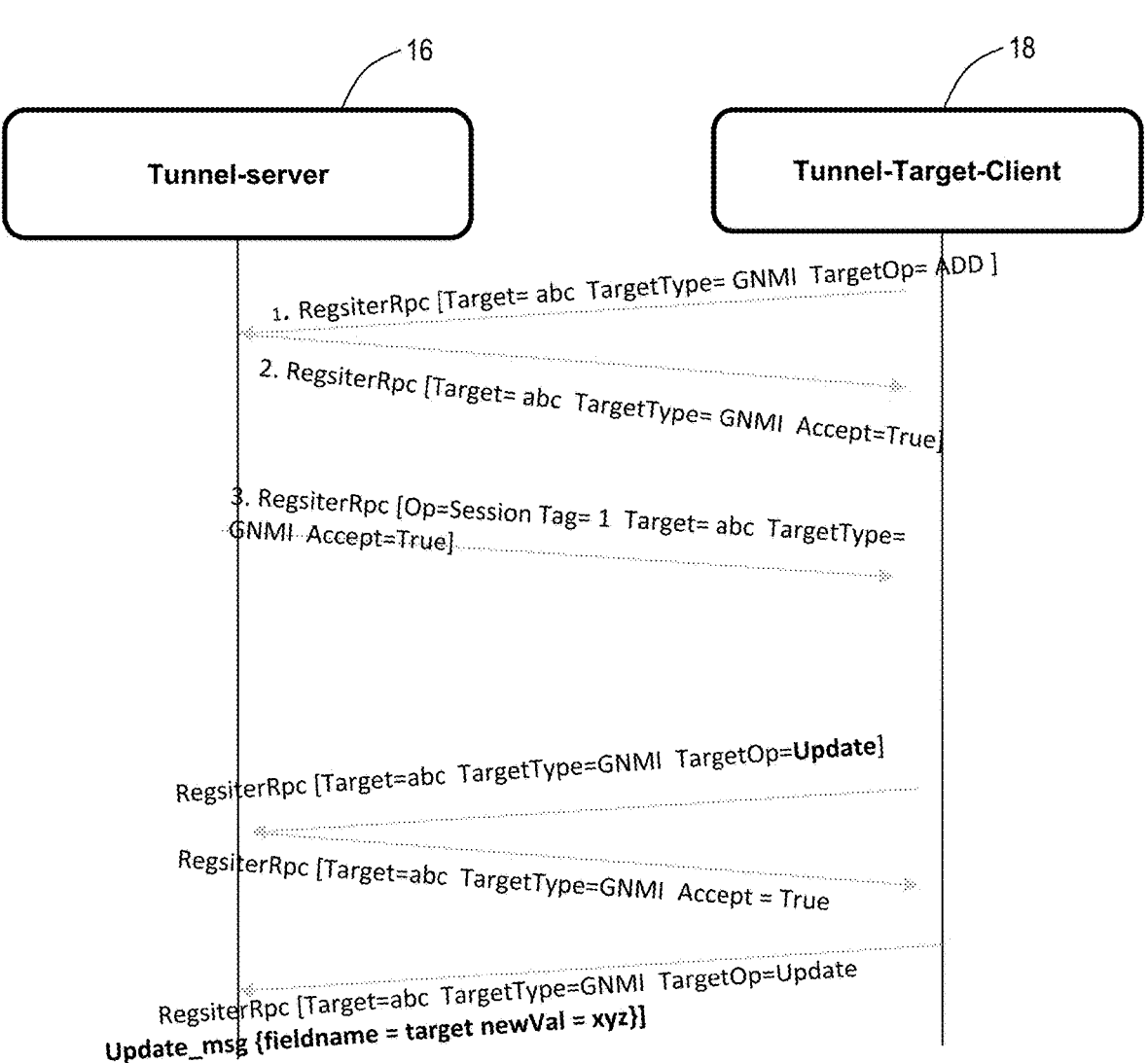
FIG. 3 is a flow sequence for the tunnel client to send an UPDATE of registered target properties and its dynamic adoption by the tunnel server.

FIG. 3 is a flow sequence for the tunnel client 18 to send an UPDATE of registered target properties and its dynamic adoption by the tunnel server 16.

```
message Update
{
    string fieldName;
    string newVal;
}
message Target {
    enum TargetOp {
        UNKNOWN = 0;
        ADD = 1;
        REMOVE = 2;
        UPDATE = 3;
    }
    TargetOp op = 1;
    // Used to ack the registration of target and target_type.
    bool accept = 2;
    // Target identifies which handler to use for a tunnel stream.
    string target = 3;
    // String value of the corresponding TargetType for a standard
protocol.
    // A non-enumerated protocol is supported so long as both tunnel
client and
    // server are in agreement on a particular value.
    string target_type = 4;
    string error = 5;
    Update update_msg = 6;
}
```

This meets key requirements for network operators who wish to have the flexibility of configuring the properties of the network element using a formula or a template instead of providing direct values for the target properties. While such a template is used, the underneath value that the template can take can change dynamically and without an ability to communicate the update in the tunnel.proto, without this approach, it will result in a limitation.

Allowing the tunnel client 18 to communicate an update to the tunnel server 16 of its own update state is useful and needed in the tunnel-based dial-out technology.

Auto Renegotiation Mechanism Between Tunnel Client and Tunnel Server—Re-Dial Behavior of Dial-Out Telemetry Also, currently, there are no known ways or methods in a tunnel-based dial-out protocol that allows auto renegotiation of the connection between the tunnel client 18 and the tunnel server 16. The connection between the tunnel client 18 and the tunnel server 16 can drop due to any network events. Due to the lack of ability for the tunnel application stack to detect the network events, the tunnel client 18 and the tunnel server 16 are left at the mercy of error detection of the transport solely based on the gRPC, HTTP2 and TCP stack and tunnel-based applications that work on top of the gRPC, HTTP2 and TCP stack have to relay of generic network error to take only defined action of terminating the existing session. Once the connection between the tunnel client 18 and the tunnel server 16 is terminated, it would require an operator intervention to identify the connection being terminated and the network element acting as a tunnel client 18 must be explicitly enabled again to initiate a new connection towards the tunnel server 16. Further, the lack of ability for the tunnel-based dial-out connection to auto redial on its own is expensive operational overhead for network monitoring system that will have tunnel server 16 based dial-out collectors.

In an embodiment, the design of the network element's tunnel application stack, which acts as a tunnel client 18, is configured to provide functionality for the tunnel client 18 to monitor and detect the network events that are detectable at the gRPC or HTTP2 or TCP stack and the tunnel client application stack takes an action based on such monitoring network events to identify either error scenarios (such as channel error, connection error etc.) as well as any network conditions (latency of gRPC keepalive interval, gRPC ping-strikes threshold exceed etc.). The tunnel client 18 can further take an intelligent action on its own to auto redial back either to the same tunnel server 16 which is a primary (e.g., after an exponential backoff time or after detecting the network event rectification) or the tunnel client 18 redials to a secondary/backup tunnel server 16 based on detection of the network or gRPC channel failure between the tunnel client 18 and the tunnel server 16.

This would significantly benefit operators as well as benefit network elements from preserving the connection between the tunnel client 18 and the tunnel server 16, providing reliable tunnel-based dial-out. As part of this approach, it also includes another aspect of using a tunnel server group—thus a tunnel-based dial-out client is not just connecting to only one destination tunnel server 16 but it would be extremely beneficial for a network element to be configured with a group of tunnel servers 16, among which one of the tunnel server 16 will be identified as primary and the rest of the tunnel servers 16 remain as secondary/backup for the tunnel client 18 to auto redial, such as in the case of a network failure between the tunnel client 18 and the primary tunnel server 16.

Figure 4:
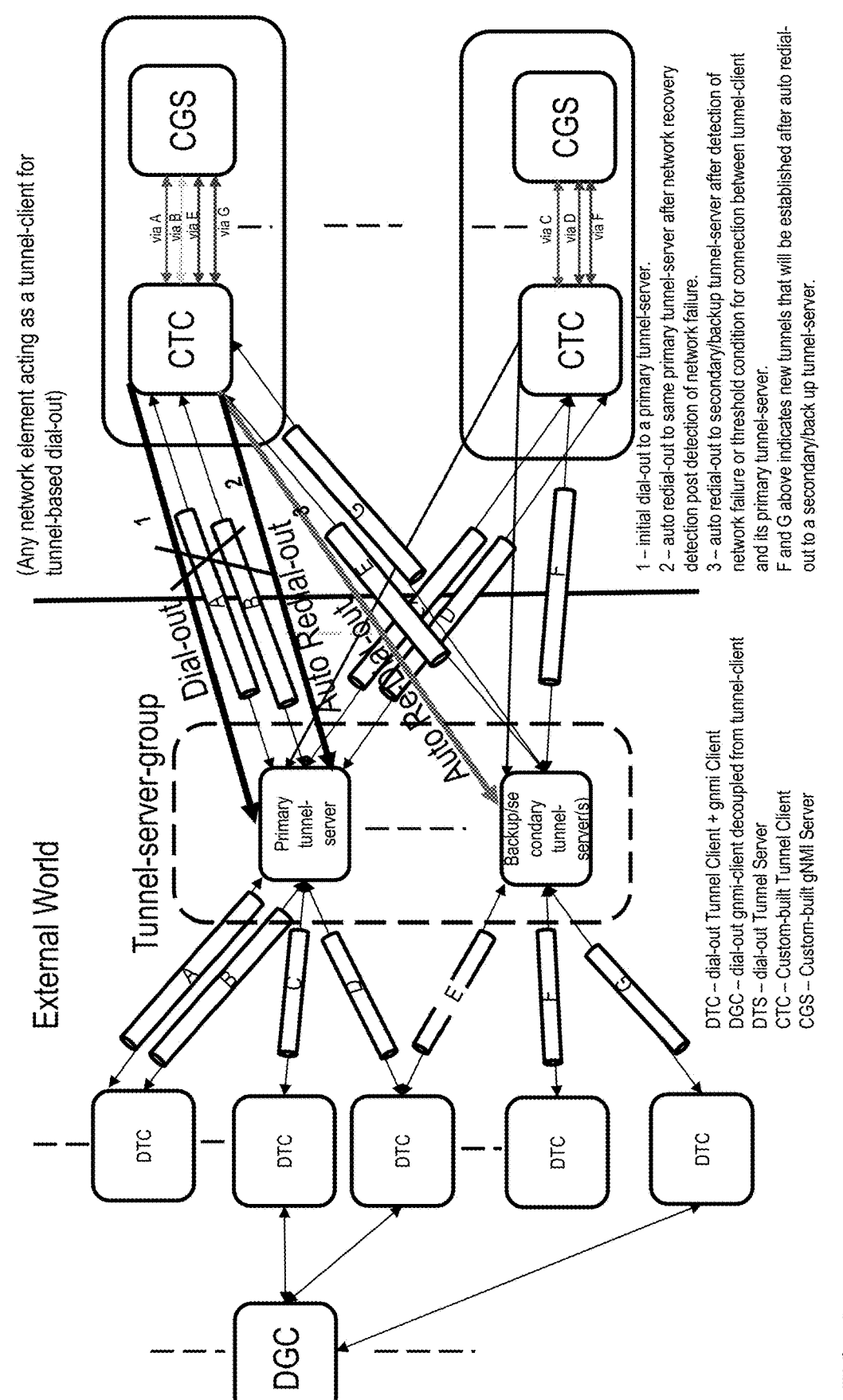
FIG. 4 is a diagram of a tunnel Session Auto Renegotiation mechanism between the tunnel client and the tunnel server, i.e., re-dial behavior of dial-out tunnel for gNMI telemetry as tunnel's service.

FIG. 4 is a diagram of a tunnel Session Auto Renegotiation mechanism between the tunnel client 18 and the tunnel server 16, i.e., re-dial behavior of dial-out tunnel for gNMI telemetry as tunnel's service.

Figure 5:
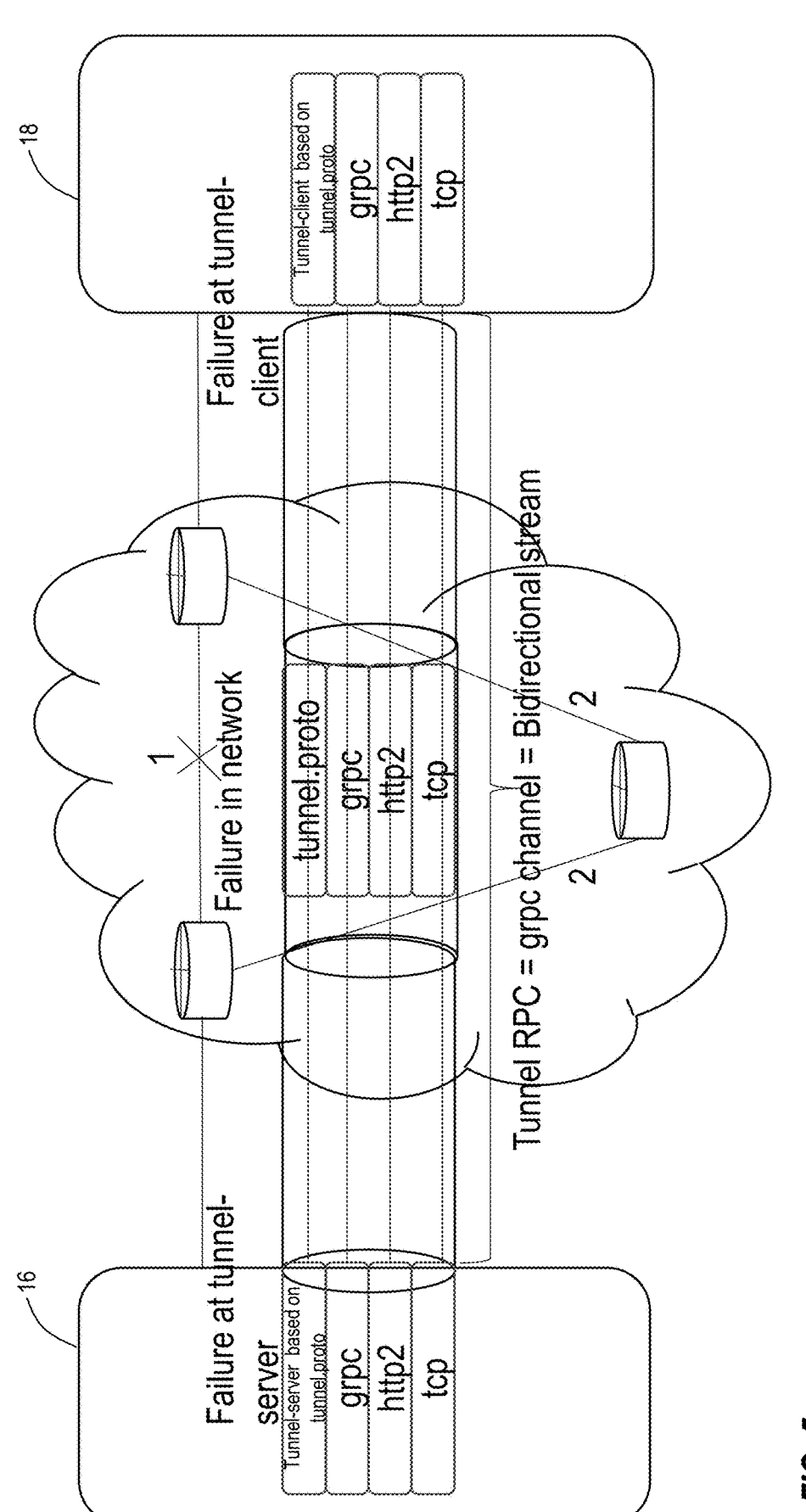
FIG. 5 is a diagram of an example of a tunnel Session Auto Renegotiation mechanism.

FIG. 5 is a diagram of an example of a tunnel Session Auto Renegotiation mechanism. A failure can happen at various points. The present disclosure detects such failures and provides an ability for the tunnel client 18 to redial back to the tunnel server 16 on its own without operator intervention.

Auto Renegotiation Mechanism Between Tunnel Client and Tunnel Server—Operating Principle, Defining Points of Failure and its Detection Buckets/Categories from Tunnel Client's Side The following categories are examples of applicability and usage of the auto renegotiation. Those skilled in the art will recognize these are merely examples for illustration purposes.

(1) Category/Bucket-1: Tunnel manager detecting failure at various stages/state-machine of the tunnel client 18 (own end-point).

(2) Category/Bucket-2: The tunnel client 18 detecting failure at the tunnel server 16 (remote end-point).

(3) Category/Bucket-3: Detection of failure in the network.

(4) Category/Bucket-4: The tunnel server 16 detecting failure at various stages (its own end-point).

(5) Category/Bucket-5: The tunnel server 18 detecting failure at the tunnel client 16 (remote end-point).

Common Reasons for a Failure that Happens at the Tunnel Client 18 that it Needs to Self-Detect can Include:

(1) Certificate validity expires.

(2) The tunnel server 16 sends an erroneous/incorrect 'tag' number in response to RegisterOp RPC.

(3) The tunnel server 16 sends accept=false in response to register RPC.

(4) The tunnel server 16 sends an 'error' Target response.

(5) Resource exhaustion on the tunnel client 18.

Common Reasons for a failure that happens at the tunnel server 16 that the tunnel client 18 needs to detect can include:

(1) The tunnel server 16 restarted.

(2) The tunnel server 16 port went down.

(3) The tunnel server 16 sent a HTTP2 GOAWAY.

(4) The tunnel server 16 does not allow HTTP2 max-ping strikes.

(5) The tunnel server 16 writes a corrupted Data on the bi-directional channel.

(6) The tunnel server 16 is busy and cannot process incoming requests from the tunnel client 18, builds gRPC channel backpressure and results in bidi i/o channel to run into error.

Common Reasons for a failure that happens in the network that both the tunnel client 18 and the tunnel server 16 needs to detect:

(1) Error conditions in TCP such as: ENETDOWN, EPROTO, ENOPROTOOPT, EHOSTDOWN, ENONET, EHOSTUNREACH, EOPNOTSUPP, ENETUNREACH.

(2) Error conditions in HTTP2 such as: GOAWAY and RST_STREAM. (PROTOCOL_ERROR, INTERNAL_ERROR, FLOW_CONTROL_ERROR, SETTINGS_TIMEOUT, STREAM_CLOSED, FRAME_SIZE_ERROR, REFUSED_STREAM, COMPRESSION_ERROR, ENHANCE_YOUR_CALM, INADEQUATE_SECURITY, HTTP_1_1_REQUIRED).

(3) Error conditions in gRPC such as: GRPC_STATUS_DEADLINE_EXCEEDED, GRPC_STATUS_UNIMPLEMENTED, GRPC_STATUS_UNAVAILABLE, GRPC_STATUS_UNKNOWN, GRPC_STATUS_INTERNAL, GRPC_STATUS_RESOURCE_EXHAUSTED, GRPC_STATUS_UNAUTHENTICATED.

Auto Renegotiation Mechanism Between Tunnel Client and Tunnel Server—Operating Principle Addressing Detection of Failure in the Network to Reconnect (to Same End-Point) or Re-Dial (to Same or a Different End-Point, Back-Up Tunnel Server).

Detection Problem: By default, a gRPC Tunnel based on gRPC sets default values for all the parameters of the stack (TCP, HTTP2, gRPC) before attempting an initial connection establishment, which cannot be modified by tunnel-client (or any gRPC based application) after a connection establishment is initiated nor can be modified for subsequent gRPC retry mechanism for connection reestablishment to the same end-point.

Phase 1: A tunnel client application stack can allow user-configurable options for setting the desired failure-detection-parameters for TCP, HTTP2 and gRPC. Such tunnel-stack will have the ability to manage per tunnel connections individually and ability to enforce the user-defined failure-detection-parameters at all levels of the stack (tunnel, gRPC, HTTP2, TCP).

(1) By this, a failure detection at every level of the stack (TCP, HTTP2, gRPC) is identified with reference to the user-configurable parameters that can be set by the user/operator provisioning the network element.

(2) User/operator can change the failure-detection-parameters at any time, should they need the reference point for failure-detection ability to be different than any of the default-values or any previously-configured-values that were applied for/as initial failure-detection-parameters.

Phase-2: A tunnel client implementation of the tunnel-stack can also have the ability to start a connect or reconnect to same end-point based upon a self-derived-failure-detection-parameters. Such a tunnel client 18 can take into consideration heuristics, pattern, statistics and load-balancing algorithms to have a network adaptable detection-policy.

Phase-3: A tunnel client implementation of the tunnel-stack can also have the ability to start a connection to connect or reconnect or redial to different end-point upon a self-derived-failure-detection-parameters, proactive-health-check of (one or more) backup-tunnel server to determine individual connection quality and choosing the best tunnel server end-point from a pool of configured tunnel servers.

Full realization is also in defining the ability for a network element to have a pool of tunnel servers 16 and its ability to monitor individual network connections and learning about the network conditions across the pool of tunnel servers and with ability to redial to the best tunnel server 16 either based upon self-derived-detection-parameters or based upon user-provisioned policy.

Reconnect and Redial solves the problem where A tunnel client 18 connects/reconnects only when an external operator provisions the device to trigger such action (e.g., by changing the state from disabled to enabled, both for first-time connection as well as for later reconnect-upon-failure or redial-upon-failure). A gRPC tunnel stack with auto reconnect and auto redial capabilities can be used and applicable in below incremental phases of its applicability.

Phase-1: A tunnel client application stack of the network element can allow user-configurable options for setting the desired reconnect-parameters. Based upon such reconnect-parameters, for all cases that such tunnel-stack application has the ability to monitor the network and detect points of failures as per the user-configured detection-parameters, it re-uses the same user-configured detection-parameters in its every subsequent reconnect attempt to the same end-point.

Phase-2: A tunnel client application stack can attempt reconnect mechanism, based on the user-configured reconnect-parameters, for all cases that will be detected based on the user-configured detection-parameters and use a new-self-derived-detection-parameters in every subsequent reconnect attempt to the same end-point. One of the user-configured can allow user to indicate a preference among:

(1) Use the user-configured detection-parameters for subsequent reconnect, or, (2) Use a new-self-derived-detection-parameters for subsequent reconnect, or, (3) Use default-detection-parameters for subsequent reconnect.

Phase-3: A tunnel client application stack can attempt re-dial to different end-point (backup tunnel server), based on the user-configured reconnect-parameters to choose a different tunnel server from the tunnel server pool. Selection of secondary tunnel server can be based upon user-configured-policy with known selection algorithms (like round-robin) or based upon proactive-health-check ability of the tunnel client application stack to self-determine the best tunnel server.

FIG. 6 is a table of some examples of user-configurable detection-parameters including when applicable and the associated use. The present disclosure itself doesn't define the basic definition and usage of below parameter at gRPC layer but it's here to show how such programmable-options of the core gRPC layer can be used as detection-parameters, made as user-configurable options by tunnel-application stack and further used for a feedback in learning the network. Also, the present disclosure is not limited to using mentioned parameters alone.

FIG. 7 is a table of some examples of user-configurable reconnect-parameters for reconnect and redial behavior including when applicable and the associated use. The present disclosure itself does not define the basic definition and usage of some of the below parameter that are already part of the gRPC protocol layer but it shows how such programmable-options of the core gRPC layer can be used as detection-parameters, made as user-configurable options by tunnel-application stack and further used for a feedback in learning the network.

Tunnel-TLS-Agent—a Proxy TLS-Tunnel Client/Server Mechanism to Multiplex and Demultiplex Secure Scalable Tunnel Client (Reduce Double Encryption Overhead for Multiple Tunnel Services)

Currently, in the tunnel-based dial-out protocol, the tunnel client 18 and the tunnel server 16 allow a secure and encrypted connection between its end points utilizing the built in secure channel encryption capabilities of the gRPC stack. Inside an encrypted tunnel session, services such as gNMI, gNOI, SSH are expected to have their own layer of encryption/decryption. Thus, the dial-out allows double encryption of the data that gets exchanged between two layer 3 network end points.

While this is a useful capability that exists and allows a cloud-based decoupled tunnel client 18 and tunnel services to exist on different layer networks, however, when both the tunnel client 18 and tunnel services are co-hosted within a same network element 20, practically performing two or more layers of encryption/decryption or reoccurring encryption/decryption using SSL can be extreme overhead for the network element 20 that participates in tunnel-based dial-out services.

The network element 20 has the cost of preforming encryption and decryption multiple times and when the tunnel client 18 and the tunnel service is already within a secure network or within the same switch, performing additional encryption/decryption for the communication that happens between the tunnel client 18 and tunnel service is redundant. As the number of tunnel services that can participate in tunnel-based dial-out increases that which are hosted within the same network element 20, each of the tunnel service's inherent overhead to do an encryption/decryption will cause service degradation especially for a time-sensitive tunnel-based service like streaming telemetry inside a tunnel-based dial-out channel.

In an embodiment, the present disclosure includes an approach to design and implement the network element's tunnel client stack as a Transport Layer Security (TLS)-tunnel-agent—which acts as a proxy for providing encryption and decryption at a single point of contact on a layer 3 network endpoint of the network element 20. The single point is configured to originate as well as terminate all tunnel-based dial-out communication over an SSL and perform the encryption and decryption at this one point of contact/port, providing the capability of multiplex and demultiplex of all tunnel and tunnel-services request and responses independent of the encryption/decryption that applies for data packets that exit the network element (or its private/bridged network).

Thus, the network element 20 can host various tunnel services without the overhead of the individual tunnel services to do their own encryption/decryption of tunnel-service's request/response and without adding the overhead of the SSL for communication that takes place between the tunnel client 18 and various tunnel-services hosted within a private network or within a bridge network. This provides a 50% reduction in overhead and a 50% increase in performance while retaining the same double encryption level of security for the traffic incoming towards the network element 20 and outgoing from the network element 20. Especially on a lesser capacity network element 20 which have less CPU and memory capabilities, thus cannot provide tunnel-based dial-out services due to the overhead of having to design and implement each tunnel services having to perform its own encryption/decryption. When the tunnel services are long-lived streaming telemetry, saving on the performance overhead of repeated encryption/decryption with this described mechanism is highly beneficial.

Figure 8A:
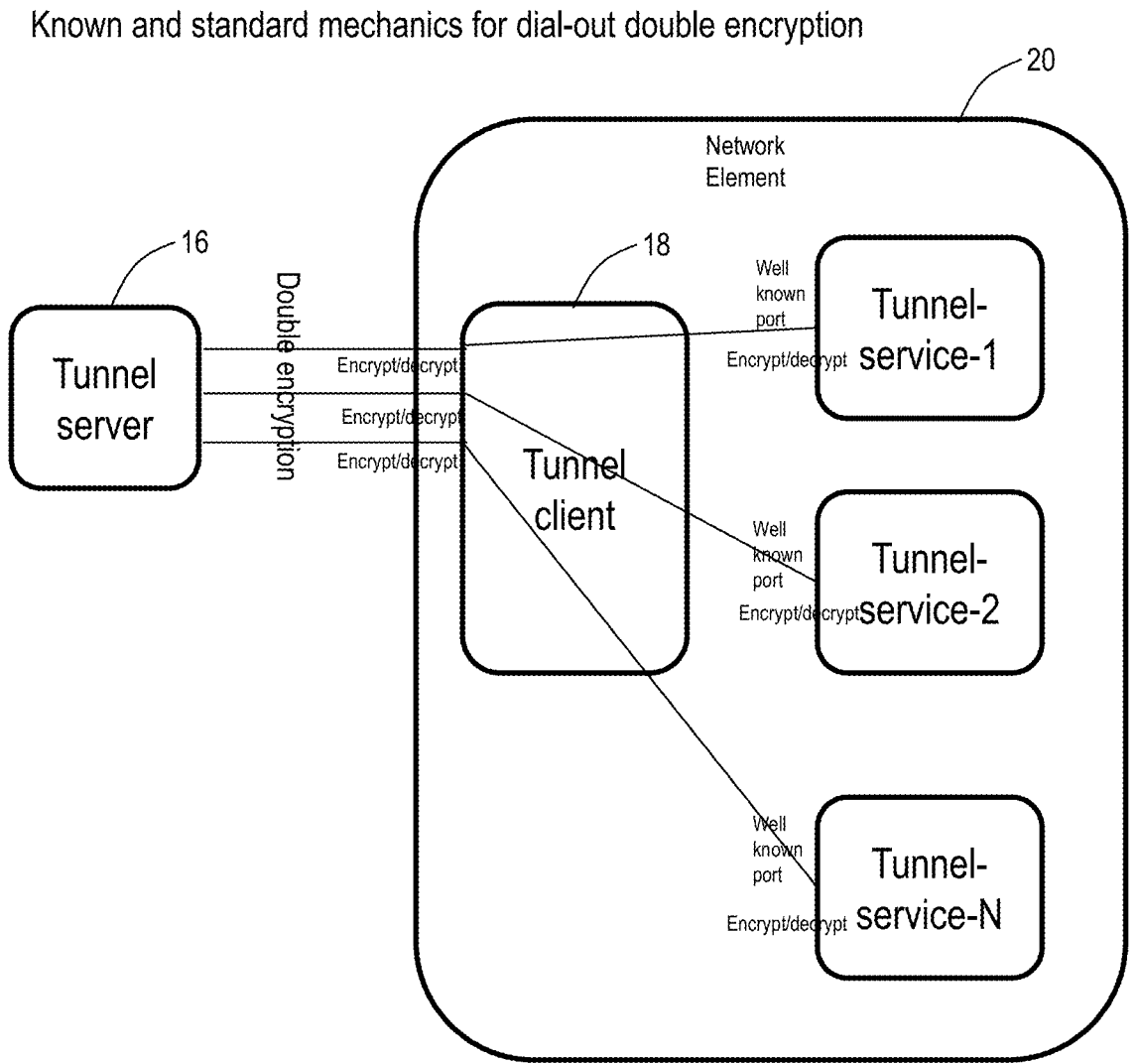
FIG. 8A is a diagram of a standard approach for dial-out double encryption.
Figure 8B:
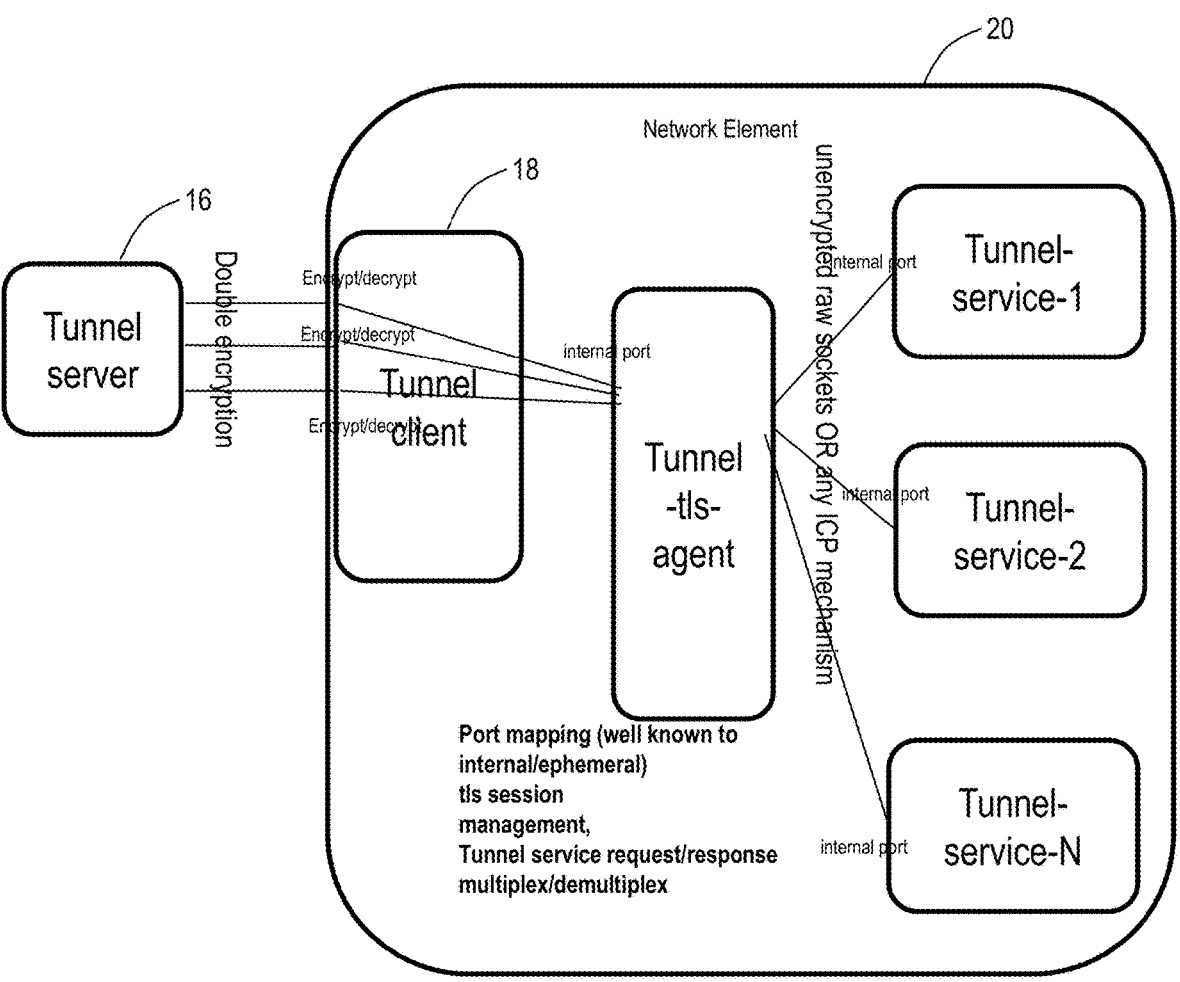
FIG. 8B is a diagram of another approach for dial-out double encryption achieving the same results with a TLS agent at the network element, reducing the double encryption.

FIG. 8A is a diagram of a standard approach for dial-out double encryption. FIG. 8B is a diagram of another approach for dial-out double encryption achieving the same results with a TLS agent at the network element, reducing the double encryption.

FIG. 9 is a diagram of an example call flow for tunnel-service gNMI with a proxy TLS tunnel client to reduce double encryption overhead for multiple tunnel services. A Tunnel-target-client is a TLS-client and encryption is provided from its IP-address and port to the external tunnel server. If the tunnel-service, gnmi.subscribe request is encrypted and it needs to be decrypted by the TLS-server, that gNMI request is not landing on the device external standard/well known port of '9339' on which TLS \-server provides the encryption from/to.

Instead, in Case of Dial-Out, with the Present Disclosure:

(1) gNMI subscribe request gets routed internally (after packets have hit the device and are inside) by a new software glue layer added to forward the encrypted gNMI-subscribe request to the common TLS-server/TLS-tunnel-agent for its decryption.

(2) This tunnel-TLS-agent listens on an internal port for serving all dial-out services use-cases.

The present disclosure allows a network element 20 an host various tunnel services without the overhead of the individual tunnel-services to do their own encryption/decryption of tunnel-service's request/response and without adding the overhead of the SSL for communication that takes place between tunnel client and various tunnel-services hosted within a private network or within a bridge network.

Second Encryption of a Tunnel Service with any Pair of Certificate and Keys Inside an Already Encrypted Tunnel for Double Encryption Currently, the known methods to implement double encryption in tunnel-based dial-out is to use the same set of certificates and keys for both encrypting/decrypting the tunnel session as well as encrypting/decrypting tunnel services that works inside the tunnel.

In an embodiment, the present disclosure configured the network element's tunnel client stack as a decoupled tunnel-TLS-agent. Such a decoupled tunnel-TLS-agent can act as a TLS-proxy for providing encryption and decryption at a single point of contact on a layer 3 network endpoint of the network element and perform the first encryption and decryption at that one point of contact/port by providing the traditional 3-way TLS handshake behavior using a first pair of certificate and key.

While the tunnel-TLS-agent also provides the capability to multiplex and demultiplex all tunnel and tunnel services request and responses independent of the encryption/decryption that happens at the first point of contact using first pair of certificate and key, it can also allow decoupling of tunnel-services from tunnel client at its gRPC connection layer such that each of the tunnel-services can provide their respective service using their own set of certificates and key pair for the second encryption.

Thus, a network element can host various tunnel services use-cases such as secure tunnel, insecure service within secure tunnel or secure tunnel with one pair of certificates and secure service with a second pair of certificate and key. The tunnel-TLS-agent can also provide an ability to manage a pool of certificates and key files that each of the tunnel-services would use. The tunnel-TLS-agent can also be an extension technology for the EST protocol (enrollment over secure transport). In this case, the tunnel-TLS-agent can perform X.509 certificate management over a secure gRPC tunnel (i.e., within the first layer of encryption) and exchange or negotiate the EST-like request/response with a tunnel server inside a dial-out tunnel session. The network element can be realized as providing a tunnel-service as an EST-like-client.

This will have significant benefit as it reduces the operator overhead to have a dedicated disassociated EST server for managing the server as well as native EST is HTTPS based whereas dial-out tunnel is HTTP2 based as it is based on the gRPC stack. So, distribution, enrollment, reenrollment, renew/rekey certificate, server-side key generation are all can be achieved as a tunnel-service and benefits from the advantages of the HTTP2 over EST.

Figure 10:
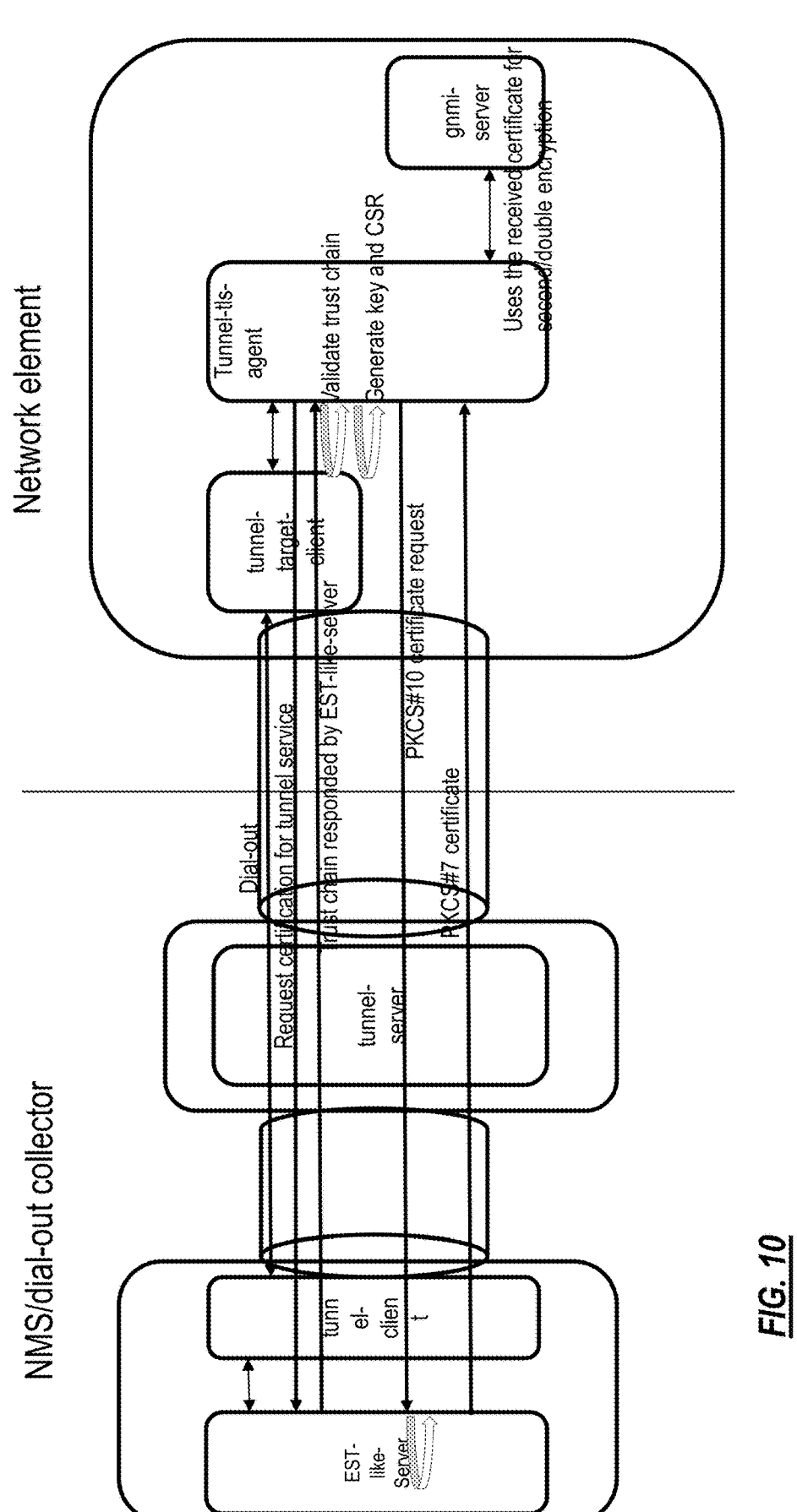
FIG. 10 is a diagram of second encryption of a tunnel service with any pair of certificate and keys inside an already encrypted tunnel for double encryption.

FIG. 10 is a diagram of second encryption of a tunnel service with any pair of certificate and keys inside an already encrypted tunnel for double encryption. Thus, this mechanism allows targets in tunnel-based dial-out technology to do the second encryption of a tunnel service with any given pair of certificate and keys for a tunnel service inside an already encrypted tunnel, providing double encryption and describes the mechanics of an HTTP2 based EST-like-Client as a tunnel-service.

HTTP2 based EST-like (also referred in this disclosure as EST 2.0), which differentiates from EST protocol by allowing request of multiple set of certificates/key files and allows multiplexing request/response improving performance and is also more secure than traditional EST—as this disclosure allows certificate and key file exchanges that takes places within an encrypted tunnel. This allows use of different pair of certificates and key instead of re-using same pair of certificates and key for encrypting tunnel as well as tunnel-service, allowing different types of encryption algorithms to be applied for different tunnel-services, and different encryption algorithms and TLS-profile properties to be applied for securing the tunnel that which may or may not be same to secure a tunnel-service.

Tunnel-Capabilities Request/Response to Tunnel Server as Well as Tunnel Services for Dynamic Stitching of Bidirectional Connections and On-Demand Enable/Disable of Tunnel Services Currently, in the tunnel-based dial-out protocol, the network element 20 as a tunnel client 18 which dials out to the tunnel server 16 in its registration operation can identify itself which target-type (i.e., which service-type) the tunnel client 18 is capable of during its registration. The network element 20 provides tunnel-based services such as SSH, NETCONF_SSH, OpenFlow, GNMI-GNOI, GRIBI as the tunnel client 18, and the tunnel client 18 needs dial-out to register itself for each of the services type individually. The tunnel client 18 is configured to send respective dialed-out registration messages for each of these services. The tunnel server 16 has no way to recognize, identify, or detect any capabilities of the tunnel service during registration itself and the tunnel client 18 has to individually send an independent registration request for different tunnel services. This is not scalable when the number of services that the network element 20 offers increases.

In an embodiment, the present disclosure includes an explicit target-capability attribute added to the tunnel such that the tunnel client 18 can dial-out to indicate all the services that the network element 20 can offer. The network element 20 can also send target-type-capability attributes to provide the set of capabilities that each of the tunnel-service has to offer. Such information is exchanged during the registration phase of the target with the tunnel server 16 and the tunnel server 16 can discover the capabilities of the target and the tunnel-services. This will streamline the dial-out registration phase process as well as allow the network elements 20 participating in tunnel based dial-out to discover the capabilities of the target with transparency, This allows the network management elements/collectors to manage the network elements both qualitatively (i.e., from eliminating the overhead of human operator to refer a product document manuals to learn about the capabilities to collector querying network elements via other interfaces to learn about the capabilities) and quantitatively (i.e., by reducing the overhead and need for collectors to send query the network element with additional set of individual service-based-capability request/response).

The tunnel server 16 can dynamically enable/disable the services based on auto learning of the capabilities. There is bidirectional target-capabilities information exchanged between the tunnel client 18 and the tunnel server 16, where the tunnel server 16 can respond back to the tunnel client 18 about the services it is interested in. This allows the tunnel client 18/network element to provide a prioritized handling of the services by disabling the services which the tunnel server 16 will not be using during the tunnel-session, saving resources such as memory and CPU cycles. The present disclosure also considers an update of target-capabilities mechanism where updated information of the target capabilities can be discovered between the tunnel client 18 and the tunnel server 16 during the life of the tunnel-session, such that dynamic enable/disable of tunnel-services can happen seamlessly.

Figure 11:
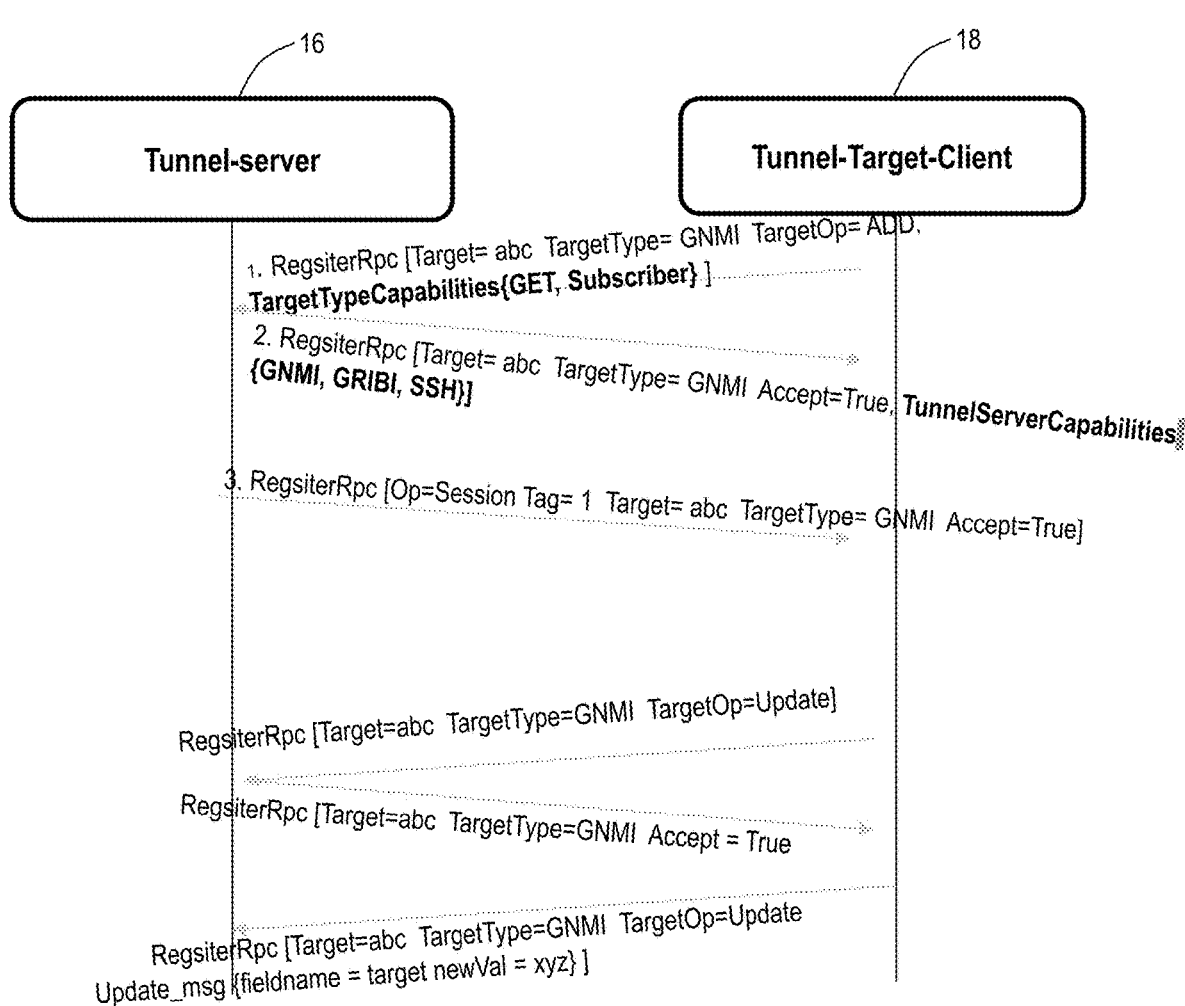
FIG. 11 is a diagram of call flow for exchanging a capabilities information between the tunnel client and the tunnel server.

FIG. 11 is a diagram of call flow for exchanging a capabilities information between the tunnel client 18 and the tunnel server 16. The present disclosure includes (1) Self detection and dynamic enabling/disabling of tunnel services based on the capability offered by another network element in a tunnel-based dial-out protocol.

(2) Exchange of tunnel capabilities during tunnel registration.

(3) Exchange of target/service capabilities during the registration of the target with a tunnel server.

Timer-Based Dial-Out Techniques and Mechanism

Currently, in tunnel-based dial-out protocols, there are no known mechanisms that allows a network element to start a dial-out at a particular time. Existing mechanisms trigger a dial-out at activation, i.e., the network element will dial-out immediately as a result of triggering such action by explicitly provisioning the network element to dial-out. Thus. existing tunnel-based dial-out timing is on-demand. Another variant of triggering dialing-out is trigger a dial-out connection towards tunnel server 16 at boot-time and keeping an ongoing bidirectional channel and long-lived layer 3 connection from the boot-time of the network element itself, within which a tunnel client can at any point in time later start/stop one or more new tunnel session. However, registration becomes a one-time event that happens at the boot time of the network element.

Both of these variants are on the extreme end of the spectrum and there are no approaches which can allow a network element to be provisioned with a future date or time at which a network element can self-activate to dial-out. Further, there are no approaches that would allow a time-duration for which a registered target or an established tunnel session needs to remain active (as opposed to being active indefinitely). There are no approaches that can allow network element to be configured with a periodicity, time-schedule pattern and frequency of occurrence of such schedule/pattern—so that network element can be configured/provisioned once with such parameters that which will allow network element to self-register and self-activate to dial-out based on a time-schedule or clock events.

In an embodiment, the present disclosure includes a provisionable time-schedule pattern such that the network element is auto-programmed to dial-out to the tunnel server 16 on a time-schedule and stay active for a defined period of time and terminate the connection when time is up. The time-scheduled based dial-out has various use-cases and allows network management entities to know ahead in time of when to expect an incoming dial-out registration request and thus tunnel server can optimize all of the collector or tunnel-service behavior.

The present disclosure specifically defines the following attributes for timer-based tunnel dial-out functionality on a network element.

(1) Dial-out target registration schedule (start-time, end-time, date)—allows a time-schedule to program the network element on when it should dial-out to register itself.

(2) Dial-out duration (time-interval)—allows the network to be programmed for how much time does the dialed-out registered target stays registered before it deregisters itself and triggers a delete operation to close its connection with the tunnel server 16 along with reclaiming any resources (CPU/memory, etc.).

(3) Dial-out periodicity/reoccurrence of the schedule/pattern—allows the network element to be programmed with a schedule/time-pattern at which times to dial-out and register with the tunnel server 16, to perform the tunnel-services and deregister, thus provided a deterministic expectation for the tunnel server 16 on when, how-long, when-next, etc.—all of which can be auto programmed upfront by an operator.

(4) Default values for the parameters, on which a timer-based dialing-out capable target can perform in the absence of any explicit provisioning of the device.

(5) Control knobs for operator to set to control the behavior of target whether timer-based or long-lived as per default standard.

Exchanging Service Proto File Between Tunnel Client and Tunnel Server for Dynamically Learning Service Types Currently, the tunnel-based dial-out protocol uses gRPC over a protobuf (protocol buffers) which is a data format used to serialize structure data and exchange the structed data. An interface description language describes the structure of data for auto generation of the entire source code for the stack of the gRPC as libraries or executables. The key essence is the interface and the interface definition language (IDL) serves as an interface/programming contract between the end points to participate in remote procedure calls over the data format defined in a .proto file. That is, a .proto file serves as such common interface/programming contract for entities to interpret and understand each other' in coherence.

The fundamental aspect of proto compilers and protobuf is based upon the notion of a common IDL data format that will be in a .proto file. As such, for any network-based communication, either publishing or exchange of such .proto file is essential. While using protobuf is the foundation of tunnel-based dial-out protocol where the entire protocol communication is well defined in an open-source forums, and is defined in a tunnel.proto which acts as the contract. So, are all other similar gRPC based technologies, protocols or services are defined for example gnmi.proto.

While it's a foundational fabric of gRPC based communication to use .proto file where the IDL data format is defined, there are no known mechanism that exists which allow any network endpoints to identify/exchange/discover/retrieve a .proto itself and all known mechanism involves explicitly sharing/publishing a .proto file ahead of time for network elements to compile and build their respective stack.

In an embodiment, the present disclosure includes using a protoparser-tunnel-service as a dial-out tunnel-service. This would allow any kind of services to work in coherence as long as those services themselves are already well-known services (such as gNMI, SSH, CLI and a corresponding .proto for those services are already known or available as standard or a common .proto file for the service is exchanged offline). While there are tools that are available to parse a .proto file as it is a standard interface definition language (IDL), the idea here is to have such protoparser as a tunnel service and it being part of the tunnel service will allow any network elements that participates in tunnel-based transport to exchange any dynamic services defined by only one entity in .proto to send the entire .proto file itself as a byte stream inside a tunnel by a protoparser-tunnel-service.

Thus, one network element can receive a new .proto file sent by another network element, parse the .proto file and use any of the existing mechanism to auto compile such .proto file to auto generate source code corresponding to such .proto file or auto generate a runtime executable and create any type of proto based fully functional executables as services on the fly. Such services will be fully functional executables and this entire aspect of protoparser-tunnel-service realized as a tunnel-services allows a reliable and secure way to exchange.proto file and autogenerating executables that would automatically work on their own and having a secure, reliable and trust-based exchange of such ability is essential to prevent from unwanted auto-generated rogue executables to be become fully functional. The present disclosure is about the mechanics of how such protoparser-tunnel-service are realized as a tunnel service thus allowing any network elements to self-learn any type of new services and to have them fully functional and working automatically.

Figure 12:
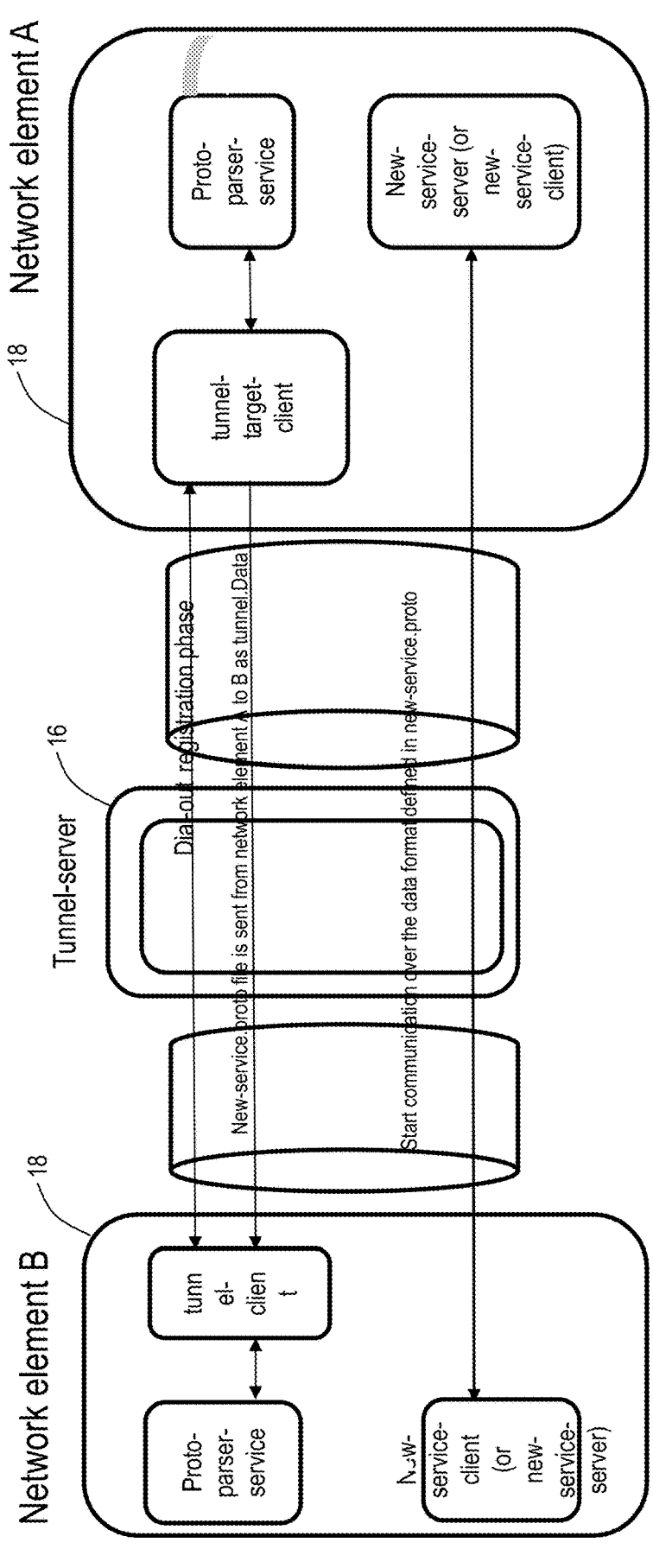
FIG. 12 is a diagram of exchanging a service proto file between the tunnel client and the tunnel server for dynamically learning known as well as unknown service types.

FIG. 12 is a diagram of exchanging a service proto file between the tunnel client 18 and the tunnel server 16 for dynamically learning known as well as unknown service types. The present disclosure includes (1) Proto parser and proto interpreter as a tunnel service capable of parsing and interpreting a proto file content exchanged as byte stream inside a tunnel—Defining the workings of a proto-parser-service inside the tunnel as a tunnel service.

(2) Dynamically discoverable newer dial-out services as well as well-known dial-out services.

(3) Self-working of any new tunnel services, known or unknown, now or later, a new paradigm for two network elements to dynamically exchange the definition of any new tunnel-services that one network element wishes to start and enables the other end of the network element making known of the common interface described in a proto file and sent as a byte stream inside a secure and established tunnel.

Tunnel Service Keepalive Mechanism and Techniques to Use for ISTSU or HA of Tunnel-Services Offered by Network Elements In a tunnel-based dial-out protocol, for a network element as a tunnel client 18 dials-out to the tunnel server 16:

(1) There are no known mechanism that allow the network element to monitor the tunnel state on its own. Rather, it completely depends on the gRPC stack which the tunnel and tunnel-based services are built upon. While gRPC manages, responds and reacts to transport layer well, it abstracts the ability for the tunnel stack (i.e., the tunnel client 18 or tunnel server 18) to take more intelligent actions to preserve the tunnel-session, i.e., to manage, respond, and react to transport events (failures, errors, overload, etc.). The present disclosure provides the mechanics to monitor the transport by the tunnel stack application for re-dialing behavior.

(2) With the ability of monitoring transport with the present disclosure, a deterministic re-dialing behavior can be achieved with the tunnel itself, there are no known mechanisms that are available which would govern any behavior with which a tunnel-service inside the tunnel (either dialed out tunnel or redialed tunnel) can be made to preserve high availability. Currently all such tunnel-services are assumed to have or provide their own individual high available capability.

(3) A typical In-Service Software Upgrade (ISSU) as applied to either an entire network element or any individual service (that may or may not participate as a tunnel-service) requires that such software service be able to go through its own version upgrade/downgrade using any of the device's established ISSU mechanisms. ISSU is known and broadly include (a) preserving the current state (either a copy in memory or swapping in/out of the memory) of a service, and (b)

using a meta-data, DDL or a common interface which serves as a reference between the version A and version B for reconciliation should there be a version upgrade/downgrade that would cause a service disruption. The act of reconciliation of the service itself post upgrade/downgrade.

The present disclosure describes a newer set of attributes that allows control of keep-alive mechanics of the tunnel. This overrides any GRPC keepalive parameters (that which are described here: github.com/grpc/grpc/blob/master/doc/keepalive.md, and enables the network element to preserve the high availability of the transport connection between the tunnel client 18 and the tunnel server 16 alive without dropping the connection. This is also used as the tunnel stack undergoes a software upgrade, as well as when any tunnel-services offered by the network element within the tunnel would themselves undergo an In-Service Tunnel Software Upgrade (ISTSU) with all associated control messages exchanged at each stages, where each of the stages themselves can be independently orchestrated.

The Present Disclosure Includes (1) A mechanism in which the tunnel client 18 and the tunnel server 16 themselves first undergo an upgrade of their respective software versions utilizing newer attributes alongside with a tunnel-keepalive and tunnel-service-keepalive mechanism. This keeps a connected tunnel alive during the upgrade, and there can be signaling of the beginning and end of the software version upgrade of the tunnel stack with tunnel-control messages.

(2) A mechanism with newer control messages that trigger an tunnel-service upgrade (in-line with a tunnel-stack upgrade or independent of the tunnel-stack software version upgrade) where such exchange of control messages between the tunnel's endpoints converges for a tunnel service (self-driven or remotely-triggered tunnel-services where such services falls in the nature of client-server relationship or parallel-instance relationship) to indicate and communicate (unicast or broadcast) a services upgrade-start, upgrade, upgrade-finished state, thus providing the ability towards an entirely self-automated orchestration of the traditional ISSU.

(3) The aspect of tunnel keepalives for preserving the tunnel itself.

This approach allows a zero-touch and self-automated orchestration of the entire upgrade process of the tunnel-services of the network elements undergoing themselves as well as an ISTSU. This can be also be used with any self and self-automated trigger criteria/conditions as well, e.g., self-detection of compatibility of tunnel-service-server's ability on one end and the tunnel client 18 upgrading on its own to complement the tunnel server's 16 ability, and vice versa, based on the nature/physical constraints of the hardware on which the software services are running. The tunnel service can self craft to its own newer variant of version and undergo an ISTSU to be compatible within the physical hardware limits that it has been deployed and signal the counter tunnel service on the other end of the tunnel, should it require or not, for it to undergo any version upgrade, downgrade or version calibration to work with or work in contrast with the former upgraded tunnel-service.

Figure 13:
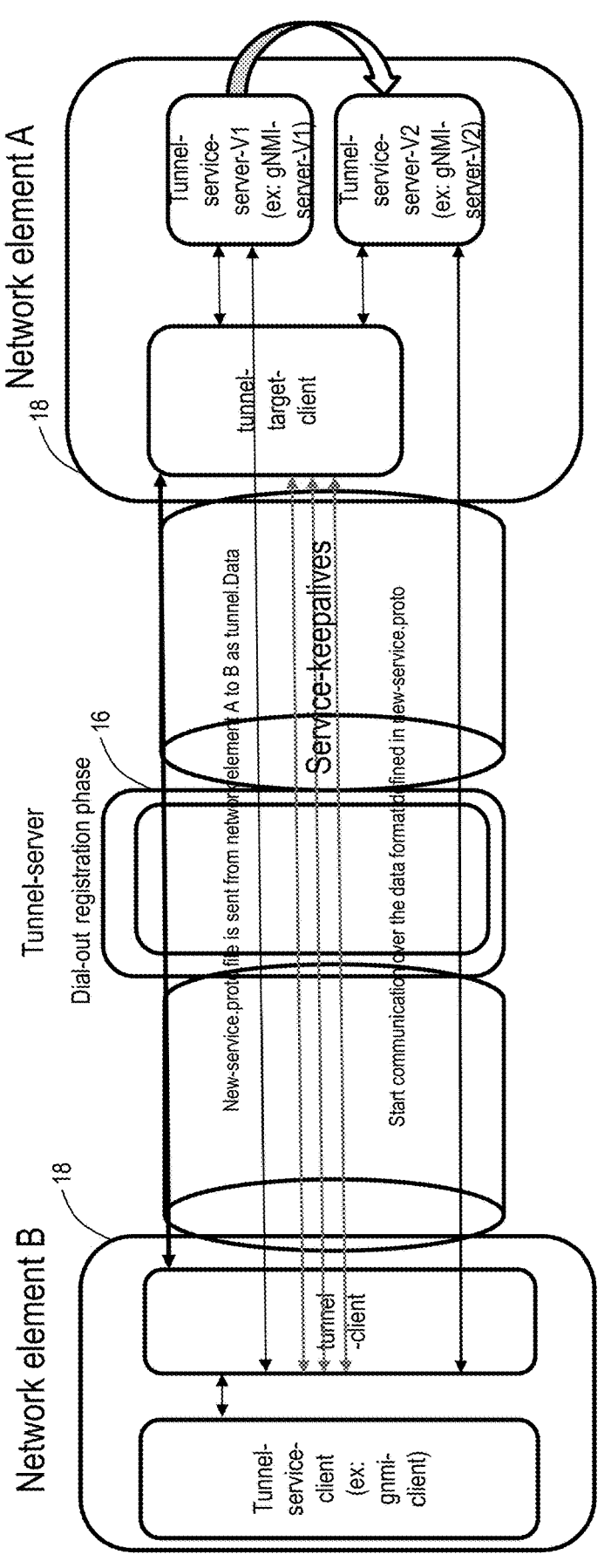

FIG. 13 is a diagram of a call flow for service keepalives. In this example, the service keepalives are between the tunnel server 16 and two tunnel clients 16 and used for preserving tunnel and service connection while tunnel service software is upgraded from version V1 to Version V2.

Tunnel-AAA-Services in Tunnel-Based Dial-Out Using Tunnel.Proto as a Base—an Integrated gRPC Tunneled Dialed-Out AAA Framework AAA is a standard with RFC 2903, "Generic AAA Architecture," August 2000, and RFC 2904, "AAA Authorization Framework," the contents of which are incorporated by reference, forms the basis for AAA. Also, for additional information, TLS 1.2 is defined in RFC 5246, "The Transport Layer Security (TLS) Protocol, Version 1.2," August 2008. As well as the authentication paradigm of gRPC (grpc.io) documented as open source available here—grpc.io/docs/guides/auth/ provide background. AAA is a framework for intelligently controlling access to computer resources, enforcing policies, auditing usage, and providing the information necessary to bill for services.

Of note and as described in the above standard, the entire framework of AAA have is from a dial-in perspective—be it a user or a network element dialing-in to other network element or an external AAA server. There are standard AAA protocols that allow a communication between a network element that provides a AAA service to communicate with external AAA servers using known protocols, such as RADIUS (Remote Authentication Dial-in User Service, described in RFC 2865, "Remote Authentication Dial In User Service (RADIUS)," June 2000, the contents of which are incorporated by reference, TACACS (Terminal Access Controller Access-Control System) which is mostly used by network elements in the core network, and DIAMETER, described in RFC 3588, "Diameter Base Protocol," September 2003, the contents of which are incorporated by reference, which is the standard that provides the entire framework for two network elements (be it a client or server) to establish workings of AAA, security for standard diameter requires extension of either using IPSec or TLS augmented separately.

gRPC breaks free the heaviness of the 'authentication' aspect of the AAA as well as the security aspect of transport between two network endpoints by adopting an inherent TLS as well as meta-data based authentication mechanism embedded in the data that is exchanged to invoke the RPC (by a gRPC based application-stack on one-end invoking RPC of the gRPC based application-stack on the other end-point of the network).

A gRPC-tunnel provides a framework for such gRPC based application-stack on each end of the transport, however, as only 'authentication' and TLS are the integral part of the gRPC—any of the 'authorization' or 'accounting' aspects of the traditional AAA framework are undefined/limitation of the gRPC framework as the nature of 'authorization' itself is not applicable beyond the 'authenticated trigger of the RPC (remote procedure call and not a request/response), thus either requires an interception of the gRPC call before the application-stack's RPC is invoked or the authorization remains as an augmented functionality that the invoked-RPC of the application-stack can further provide as a service.

Disadvantageously, (1) Such increases the complexity of bringing in multiple tiers of redirection before an RPC gets authorized as well as there are no context for the RPC to authorize against—besides the traditional 'role'/'privilege' information based authorization.

(2) There are no known framework that exists which would allow two tunnel-stacks (i.e., for the tunnel client 18 and the tunnel server 16) to be able to independently perform all parts of AAA without depending on another heavy-weight protocol such DIAMETER and then adding a security layer on top of DIAMETER to secure it with either IPSec or TLS. These are not required when using gRPC-Tunnel as the fabric of gRPC and the security of the tunnel embeds security into its transport layer and allows any application-stack to be integrated as tunnel-service.

(3) From a tunnel client 18 which participates in dialed-out behavior, applying any known AAA framework always leads to a lot of redundancy (multiple layers of AAA when such is not required).

These disadvantages are the primary reasons for proposing the techniques in this area for an integrated gRPC Tunneled dial-out AAA framework.

An integrated gRPC tunneled dial-out AAA framework utilizes the 'authentication' and security aspects available within the fabric of gRPC and while the present disclosure starts with proposing such AAA framework for a tunnel-based dial-out itself, other key points include:

(1) By having a tunnel-AAA-service, any network element can achieve 'AAA' very effectively, at a single and first point of contact/entry with the basic authenticate request/reply, authorization request/reply and accounting request/reply messages defined as a tunnel-AAA-service and as a proto and the two end points participating/connected by the gRPC-tunnel both can perform and provide single or mutual authentication, authorization and exchange information for any accounting.

(2) This idea proposes the definition of the 'authorization' as a super-set and different from any traditionally known 'role or privilege' based authorization. That is, tunnel-authorization allows tunnel-service-based authorization. An authenticated RPC may or may not be able to use one or more tunnel services that the network devices provides. Such tunnel service based authorization allows flexibility for carving authorization at the granularity of the tunnel services and tunnel services can be as small as defined by the network element (running a script or CLI to obtain a show command output or to execute a simple command on one end—at the same time—a service can be an entire gRIB, gNOI, or any of the single or a suite of routing-protocols). A tunnel service-based authorization (not limited to outside of the dial-out tunnel) significantly increases and enables the network element towards service-slicing based access-control.

(3) Tunnel service-slicing based access-control in itself.

(4) The present disclosure eliminates the needs of the redundant tiers that come with integrating any dial-in AAA framework and eliminating the need of any additional security like IPsec or TLS that would be required to for a secured AAA. A tunnel-AAA-framework provides an in-built layer of TLS encryption.

(5) The present disclosure introduces the gRPC tunnel stack and will have tunnel-AAA-client-service and tunnel-AAA-server-services as mentioned in this new AAA framework that may use any of the existing method of implemented technology like TLS as a secondary/tunnel-service encryption to retrofit as the gRPC-tunnel based AAA framework which provides the double-encryption/service-encryption within tunnel-encryption already integrated within the tunnel as it's a gRPC within gRPC;

(6) An integrated framework of this nature could be fundamentally viewed as an alternate for DIAMETER+IPSeC or DIAMETER+TLS and will be applicable as a replacement to such heavyweight protocols. An AAA framework built with gRPC as a transport fabric and gRPC itself is unanimously accepted as the best option for communication between any microservice or network endpoints benefits the network devices by many folds.

Figure 14:
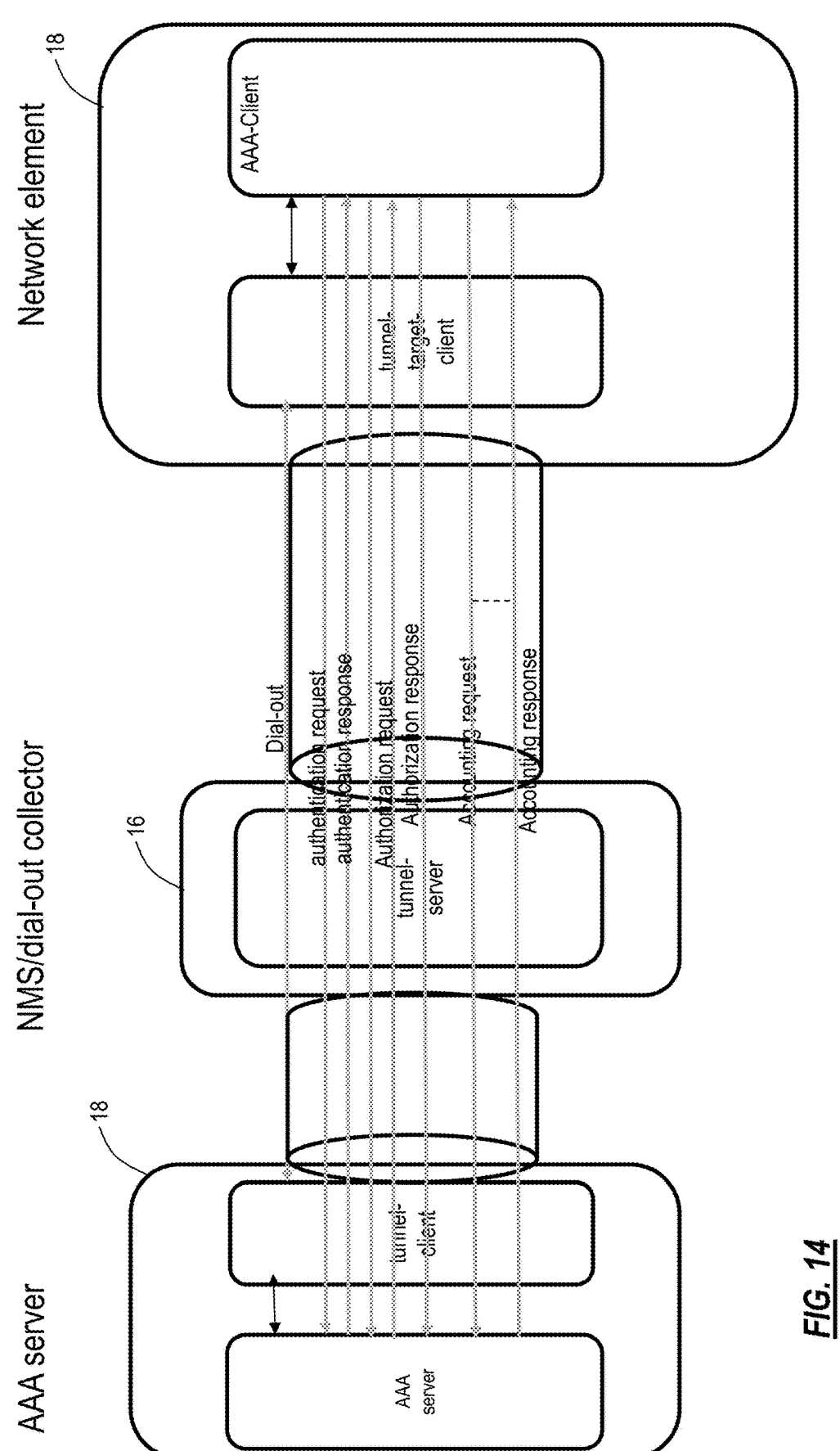
FIG. 14 is a diagram of techniques for a tunnel service to dial-out to AAA servers.

FIG. 14 is a diagram of techniques for a tunnel service to dial-out to AAA servers. Using tunnel.proto for AAA (i.e., tunnel-based AAA).

Using gRPC Dial-Out Tunnel and HTTP2 Encapsulated Radius Protocol

The RADIUS protocol, RFC 2865, is a widely deployed authentication and authorization protocol. The supplementary RADIUS Accounting specification, RFC 2866, "RADIUS Accounting," June 2000, the contents of which are incorporated by reference, provides accounting mechanisms, thus delivering a full Authentication, Authorization, and Accounting (AAA) solution. However, RADIUS has shortcomings, such as its dependency on the unreliable transport protocol User Datagram Protocol (UDP) and the lack of security for large parts of its packet payload and with a RADIUS security based on the MD5 algorithm, has always been proven to be insecure.

That led to the radius working group to extend and propose a RadSec (TLS encryption for RADIUS), RFC 6614, "Transport Layer Security (TLS) Encryption for RADIUS," May 2012, the contents of which are incorporated by reference, whose focus is RADIUS over TLS to provide an approach to secure the communication between RADIUS/TCP peers using TLS).

Another significant alternate proposal for RADIUS protocol itself is RADIUS Over TCP (RFC 6614)—which provides an alternate for RADIUS to use TCP for its datagram as an alternate for the traditional RADIUS using UDP if and only if the transport layer is a TLS and IPSec that provides the security of the protocol communication. In general, using RADIUS over TCP is widely understood as not favorable as the fundamental aspect of RADIUS using UDP provides a connectionless, simple and scalable protocol as compared to RADIUS over TCP but due to lack of security, using RadSec is the widely used mechanisms but it comes at the cost of an expensive TLS and/or IPsec connection management overhead as well as the native TCP does not allow multiplexing of TCP even when used within TLS or IPsec as transport as TLS security as a HTTPS based.

In an embodiment, the present disclosure includes the idea of RADIUS over gRPC and RADIUS as a tunnel-service inside a gRPC-tunnel. The present disclosure is about the entire mechanics of how a traditional RADIUS protocol is realized as a tunnel service thus allowing any network elements to utilize the HTTP2 based gRPC which provides multiplexing ability of the transport, thus fundamentally makes this better scalable retaining every characteristics of the RADIUS, RADIUS Over TCP, and RadSec.

gRPC as a transport is the evolving future proof transport that simplifies every complexity of traditional tier-ed application stacks where one layer expands at providing application protocol behaviors and another tier provides connection and security. gRPC bridges the gap by being the most efficient transport compared to traditional TCP and/or UDP. While gRPC initially started as an efficient transport for communication between two microservices, its potential benefit for using the gRPC as a fundamental secure transport for any network device to network device communication is the potential scope of evolution of tunnel.proto, which is ready to be geared towards such and it provides the background with respect to using the gRPC for all device northbound protocols. Specifically, this disclosure is in the scope of using RADIUS as tunnel-service providing an alternate for any traditional RADIUS and/or RadSec usage across the spectrum of layer 3 network devices.

The Present Disclosure Includes:

(1) RADIUS as gRPC tunnel service.

(2) Duplex streaming of RADIUS UDP datagram inside the gRPC tunnel, eliminating the need for RadSec, yet achieving the secure transport. This is a better alternate to RFC 6614.

(3) Duplex streaming of RADIUS TCP datagram eliminating the need of an additional IPSeC tunnel or additional TLS security layer, yet achieving the secure transport. The is a better alternate to RFC 6615.

(4) RADIUS over HTTP/2.

The traditional RADIUS protocol, described in a single protobuf, an IDL language, for communications of both a RADIUS-client and RADIUS-server, becomes possible to use as RPC.

Figure 15:
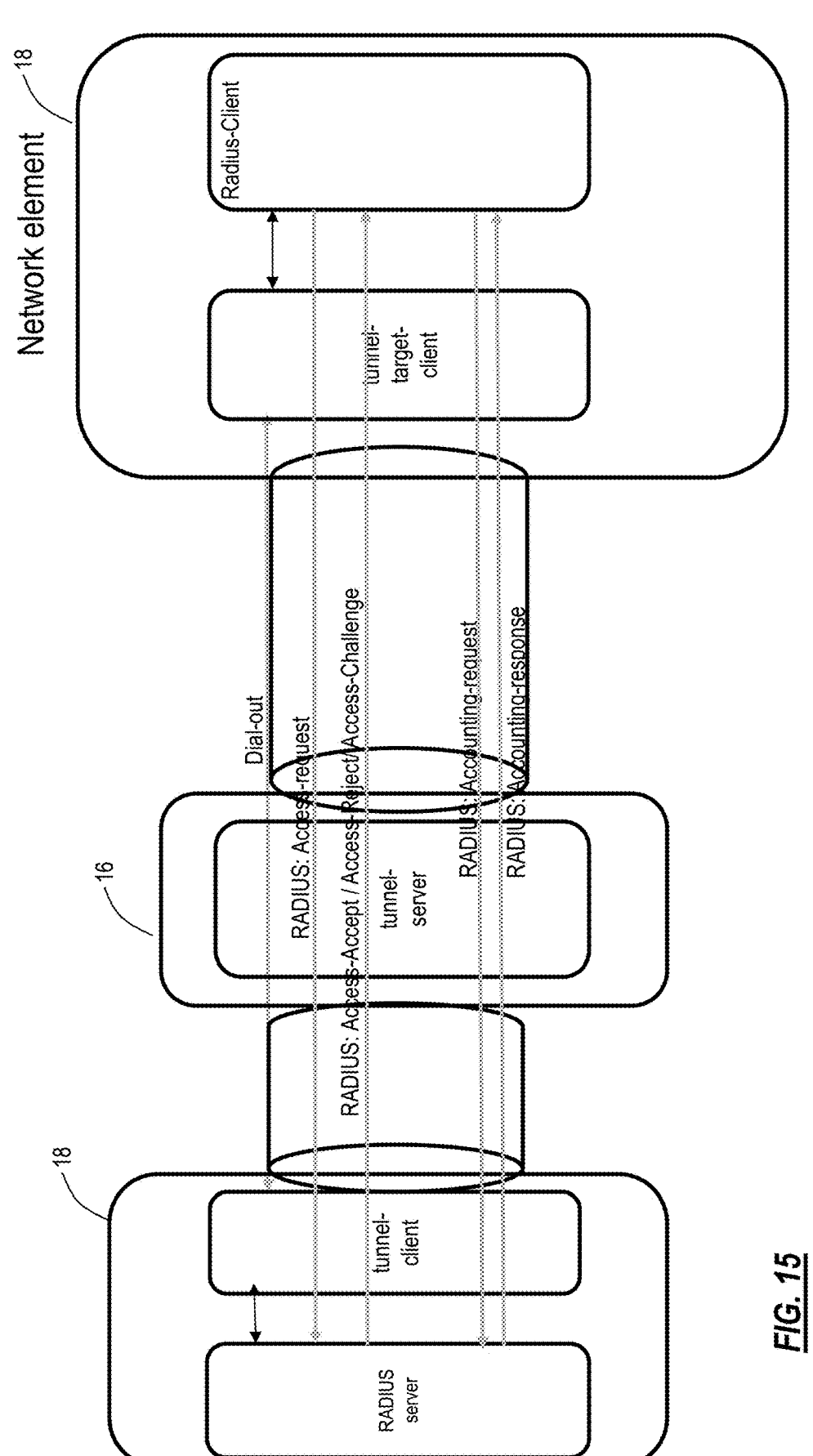
FIG. 15 is a diagram of techniques for a HTTP2 and gRPC dial-out tunnel-based RADIUS protocol.

There is a limitation in the security. As RPC means invoking a procedure call on other end point and, for the AAA protocol, invoking a remote procedure call on another end-point would require authentication and authorization applied for such actions itself to begin with. Thus, even though the idea of a single protobuf defined RADIUS allows benefits of gRPC as a transport, but if it is not design as a traditional client-server protocol, it leads to the incoherence and cyclical security concern of who is an authenticator and who is getting authenticated. So, the approach of RADIUS as tunnel-service provides a deterministic framework for such a cyclical security concern. FIG. 15 is a diagram of techniques for a HTTP2 and gRPC dial-out tunnel-based RADIUS protocol.

Tunnel Client

FIG. 16 is a flowchart of a process 40 implemented at a tunnel client 18. The process 40 can be a method having steps, via circuitry configured to implement the steps, and as instructions stored in a non-transitory computer-readable medium. The process 40 includes forming a tunnel service for telemetry inside a dialed-out tunnel from the tunnel client to a tunnel server, wherein the tunnel service is between a network element, communicatively coupled to the tunnel client, and a network management system communicatively coupled to the tunnel server (step 42), and preserving the tunnel service via keepalives including during a software upgrade associated with any of the network management system and the network element and with the tunnel service itself.

The process 40 can further include signaling a beginning and an end of any software update. The process 40 can further include detecting an upgraded ability of the tunnel server and perform an upgrade of the tunnel service based thereon. The tunnel service can be a Remote Procedure Call (gRPC) Network Management Interface (gNMI) service. The process 40 can further include implementing a tunnel-based Authentication, Authorization, and Accounting (AAA) framework utilizing gRPC. The AAA framework can utilize existing security in the gRPC along with remote Authentication, service Authorization and Accounting provided as tunnel-service(s). The process 40 can further include implement Remote Authentication Dial-in User Service (RADIUS) over gRPC.

Tunnel Server

FIG. 17 is a flowchart of a process 60 implemented at a tunnel server 16. The process 60 can be a method having steps, via circuitry configured to implement the steps, and as instructions stored in a non-transitory computer-readable medium. The process 60 includes forming a tunnel service for telemetry inside a dialed-out tunnel from a tunnel client to the tunnel server, wherein the tunnel service is between a network management system, communicatively coupled to the tunnel server, and a network element communicatively coupled to the tunnel client (step 62), and preserving the tunnel service via keepalives including during a software upgrade associated with any of the network management system and the network element and with the tunnel service itself (step 64).

The process 60 can further include signaling a beginning and an end of any software update. The process 60 can further include providing an upgraded ability of the tunnel server to the one or more tunnel clients which perform an upgrade of the tunnel service based thereon. The tunnel service can be a Remote Procedure Call (gRPC) Network Management Interface (gNMI) service. The process 60 can further include implement a tunnel-based Authentication, Authorization, and Accounting (AAA) framework utilizing gRPC. The AAA framework can utilize existing security in the gRPC. The process 60 can further include implementing Remote Authentication Dial-in User Service (RADIUS) over gRPC.

Process

FIG. 18 is a flowchart of a process 80 between a tunnel server 16 and a tunnel client 18. The process 80 can be a method having steps, via circuitry configured to implement the steps, and as instructions stored in a non-transitory computer-readable medium. The process 80 includes forming a tunnel service for telemetry inside a dialed-out tunnel from a tunnel client to a tunnel server, wherein the tunnel service is between a network element, communicatively coupled to the tunnel client, and a network management system communicatively coupled to the tunnel server (step 82); and preserving the tunnel service via keepalives including during a software upgrade associated with any of the network management system and the network element and with the tunnel service itself (step 84).

The process 80 can further include signaling a beginning and an end of any software update. The process 80 can further include detecting an upgraded ability of the tunnel service at either the tunnel server or the tunnel client and performing an upgrade of the tunnel service based thereon. The tunnel service can be a Remote Procedure Call (gRPC) Network Management Interface (gNMI) service. The process 80 can further include implementing a tunnel-based Authentication, Authorization, and Accounting (AAA) framework utilizing gRPC. The process 80 can further include implementing Remote Authentication Dial-in User Service (RADIUS) over gRPC.

CONCLUSION

It will be appreciated that some embodiments described herein may include one or more generic or specialized processors (one or more processors) such as microprocessors; Central Processing Units (CPUs); Digital Signal Processors (DSPs): customized processors such as Network Processors (NPs) or Network Processing Units (NPUs), Graphics Processing Units (GPUs), or the like; Field Programmable Gate Arrays (FPGAs); and the like along with unique stored program instructions (including software and/or firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application-Specific Integrated Circuits (ASICs), in which each function or some combinations of certain of the functions are implemented as custom logic or circuitry. Of course, a combination of the aforementioned approaches may be used. For some of the embodiments described herein, a corresponding device in hardware and optionally with software, firmware, and a combination thereof can be referred to as circuitry configured or adapted to, logic configured or adapted to, a circuit configured to, one or more circuits configured to, etc. perform a set of operations, steps, methods, processes, algorithms, functions, techniques, etc. on digital and/or analog signals as described herein for the various embodiments.

Moreover, some embodiments may include a non-transitory computer-readable storage medium having computer-readable code stored thereon for programming a computer, server, appliance, device, processor, circuit, etc. each of which may include a processor to perform functions as described and claimed herein. Examples of such computer-readable storage mediums include, but are not limited to, a hard disk, an optical storage device, a magnetic storage device, a Read-Only Memory (ROM), a Programmable Read-Only Memory (PROM), an Erasable Programmable Read-Only Memory (EPROM), an Electrically Erasable Programmable Read-Only Memory (EEPROM), Flash memory, and the like. When stored in the non-transitory computer-readable medium, software can include instructions executable by a processor or device (e.g., any type of programmable circuitry or logic) that, in response to such execution, cause a processor or the device to perform a set of operations, steps, methods, processes, algorithms, functions, techniques, etc. as described herein for the various embodiments.

Although the present disclosure has been illustrated and described herein with reference to embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims. Further, the various elements, operations, steps, methods, processes, algorithms, functions, techniques, modules, circuits, etc. described herein contemplate use in any and all combinations with one another, including individually as well as combinations of less than all of the various elements, operations, steps, methods, processes, algorithms, functions, techniques, modules, circuits, etc.

What is claimed is:

1. A tunnel client implemented by circuitry configured to:
   form a tunnel service for telemetry inside a dialed-out tunnel from the tunnel client to a tunnel server, wherein the tunnel service is between a network element, communicatively coupled to the tunnel client, and a network management system communicatively coupled to the tunnel server, wherein the dialed-out tunnel comprises a remote procedure call (gRPC) tunnel that transports a transparent, bi-directional transmission control protocol (TCP)-over-gRPC channel initiated by the network element toward the tunnel server, and wherein forming the tunnel service includes establishing a long-lived bi-directional Register remote procedure call (RPC) between the tunnel client and the tunnel server that remains open while both the tunnel client and the tunnel server are alive, and
   preserve the tunnel service via keepalives including during a software upgrade associated with any of the network management system and the network element and with the tunnel service itself, wherein preserving comprises (i) overriding default gRPC keepalive parameters using tunnel-stack keepalive attributes, and (ii) exchanging tunnel-control messages indicating upgrade-start and upgrade-finished states for an in-service software upgrade (ISSU) of the tunnel client or the tunnel server or for an in-service tunnel software upgrade (ISTSU) of the tunnel service, such that the established dialed-out tunnel and the tunnel service remain connected without teardown during the software upgrade.

2. The tunnel client of claim 1, wherein the circuitry is further configured to
   signal a beginning and an end of any software update.

3. The tunnel client of claim 1, wherein the circuitry is further configured to
   detect an upgraded ability of the tunnel server and perform an upgrade of the tunnel service based thereon, wherein detecting comprises receiving, during tunnel registration or during a life of an established tunnel session, bidirectional capability information identifying (i) a set of tunnel ser es supported by the tunnel server and (ii) service-type capabilities for at least one tunnel service, and wherein performing the upgrade comprises dynamically enabling, disabling, or updating operation of the tunnel service in-line with the established tunnel session based on the received capability information without disconnecting the tunnel session.

4. The tunnel client of claim 1, wherein the tunnel service is a gRPC Network Management Interface (gNMI) service.

5. The tunnel client of claim 4, wherein the circuitry is further configured to
   implement a tunnel-based Authentication, Authorization, and Accounting (AAA) framework utilizing gRPC.

6. The tunnel client of claim 5, wherein the AAA framework utilizes existing security in the gRPC along with remote Authentication, service Authorization and Accounting provided as tunnel-service(s).

7. The tunnel client of claim 4, wherein the circuitry is further configured to
   implement Remote Authentication Dial-in User Service (RADIUS) over gRPC.

8. A tunnel server implemented by circuitry configured to:
   form a tunnel service for telemetry inside a dialed-out tunnel from a tunnel client to the tunnel server, wherein the tunnel service is between a network management system, communicatively coupled to the tunnel server, and a network element communicatively coupled to the tunnel client, wherein the dialed out tunnel comprises a gRPC tunnel that transports a transparent, bi-directional TCP-over-gRPC channel initiated by the network element toward the tunnel server, and wherein forming the tunnel service includes establishing a long-lived bi-directional Register RPC between the tunnel client and the tunnel server that remains open while both the tunnel client and the tunnel server are alive, and
   preserve the tunnel service via keepalives including during a software upgrade associated with any of the network management system and the network element and with the tunnel service itself, wherein preserving comprises (i) overriding default gRPC keepalive parameters using tunnel-stack keepalive attributes, and (ii) exchanging tunnel-control messages indicating upgrade-start and upgrade-finished states for an ISSU of the tunnel client or the tunnel server or for an ISTSU of the tunnel service, such that the established dialed-out tunnel and the tunnel service remain connected without teardown during the software upgrade.

9. The tunnel server of claim 8, wherein the circuitry is further configured to signal a beginning and an end of any software update.

10. The tunnel server of claim 8, wherein the circuitry is further configured to provide an upgraded ability of the tunnel server to the tunnel client which performs an upgrade of the tunnel service based thereon.

11. The tunnel server of claim 8, wherein the tunnel service is a gRPC Network Management Interface (gNMI) service.

12. The tunnel server of claim 11, wherein the circuitry is further configured to implement a tunnel-based Authentication, Authorization, and Accounting (AAA) framework utilizing gRPC.

13. The tunnel server of claim 12, wherein the AAA framework utilizes existing security in the gRPC.

14. The tunnel server of claim 11, wherein the circuitry is further configured to implement Remote Authentication Dial-in User Service (RADIUS) over gRPC.

15. A method comprising steps of:

forming a tunnel service for telemetry inside a dialed-out tunnel from a tunnel client to a tunnel server, wherein the tunnel service is between a network element, communicatively coupled to the tunnel client, and a network management system communicatively coupled to the tunnel server, wherein the dialed-out tunnel comprises a gRPC tunnel that transports a transparent, bi-directional TCP-over-QRPC channel initiated by the network element toward the tunnel server, and wherein forming the tunnel service includes establishing a long-lived bi-directional Register RPC between the tunnel client and the tunnel server that remains open while both the tunnel client and the tunnel server are alive; and preserving the tunnel service via keepalives including during a software upgrade associated with any of the network management system and the network element and with the tunnel service itself, wherein preserving comprises (D) overriding default gRPC keepalive parameters using tunnel-stack keepalive attributes, and (ii) exchanging tunnel-control messages indicating upgrade-start and upgrade-finished states for an ISSU of the tunnel client or the tunnel server or for an ISTSU of the tunnel service, such that the established dialed-out tunnel and the tunnel service remain connected without teardown during the software upgrade.

16. The method of claim 15, wherein the steps further include signaling a beginning and an end of any software update.

17. The method of claim 15, wherein the steps further include detecting an upgraded ability of the tunnel service at either the tunnel server or the tunnel client and performing an upgrade of the tunnel service based thereon.

18. The method of claim 15, wherein the tunnel service is a gRPC Network Management Interface (gNMI) service.

19. The method of claim 15, wherein the steps further include implementing a tunnel-based Authentication, Authorization, and Accounting (AAA) framework utilizing gRPC.

20. The method of claim 15, wherein the steps further include implementing Remote Authentication Dial-in User Service (RADIUS) over gRPC.

* * * * *